(12) United States Patent
Yamaura et al.

(10) Patent No.: US 9,961,147 B2
(45) Date of Patent: May 1, 2018

(54) COMMUNICATION APPARATUS, INFORMATION PROCESSOR, COMMUNICATION METHOD, AND COMPUTER-READABLE STORAGE MEDIUM

(71) Applicant: KABUSHIKI KAISHA TOSHIBA, Tokyo (JP)

(72) Inventors: Takahiro Yamaura, Kanagawa (JP); Yuta Kobayashi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 444 days.

(21) Appl. No.: 14/644,786

(22) Filed: Mar. 11, 2015

(65) Prior Publication Data
US 2015/0264141 A1 Sep. 17, 2015

(30) Foreign Application Priority Data
Mar. 13, 2014 (JP) .................. 2014-050697

(51) Int. Cl.
*G06F 3/00* (2006.01)
*G06F 13/28* (2006.01)
(Continued)

(52) U.S. Cl.
CPC ............ *H04L 67/141* (2013.01); *H04L 43/04* (2013.01); *H04L 69/16* (2013.01); *H04L 69/321* (2013.01)

(58) Field of Classification Search
CPC ........... H04L 12/2801; H04L 63/1458; H04W 76/027; H04W 24/02
(Continued)

(56) References Cited

U.S. PATENT DOCUMENTS 7,693,166 B2 4/2010 Matsuura
7,724,771 B2 5/2010 Imao
(Continued)

FOREIGN PATENT DOCUMENTS

JP 2005-184846 7/2005
JP 2006-260543 9/2006
(Continued)

OTHER PUBLICATIONS

Defense Advanced Research Projects Agency, Information Sciences Institute, University of Southern California "Transmission Control Protocol DARPA Internet Program Protocol Specification," prepared for Information Processing Techniques Office, Arlington, VA, Sep. 1981, pp. 1-92.
(Continued)

*Primary Examiner* — Idriss N Alrobaye
*Assistant Examiner* — Getente A Yimer
(74) *Attorney, Agent, or Firm* — Nixon & Vanderhye, P.C.

(57) ABSTRACT

According to one embodiment, a communication apparatus comprises a transmission processing unit that transmits a connection establishment request on a predetermined protocol or a connection acceptance response, to a partner apparatus through a network, the connection acceptance response being a response of acceptance of the connection establishment request on the predetermined protocol. The communication apparatus comprises an analyzing unit that analyzes a reception frame received from the network. The communication apparatus comprises a state transition processing unit that transits a connection state to a connection establishment state.

18 Claims, 15 Drawing Sheets

(51) Int. Cl.
  *G06F 13/42* (2006.01)
  *H04L 29/08* (2006.01)
  *H04L 29/06* (2006.01)
  *H04L 12/26* (2006.01)

(58) Field of Classification Search
  USPC .................................. 710/8, 11, 15, 25, 105
  See application file for complete search history.

(56) References Cited

U.S. PATENT DOCUMENTS

| | | | |
|---|---|---|---|
| 7,899,913 B2 | 3/2011 | Minami et al. | |
| 8,725,879 B2 | 5/2014 | Ajima et al. | |
| 9,130,957 B2 | 9/2015 | Yamaura et al. | |
| 2002/0089969 A1* | 7/2002 | Kano | H04L 12/2801 370/351 |
| 2006/0191003 A1* | 8/2006 | Bahk | H04L 63/0254 726/14 |
| 2006/0221946 A1 | 10/2006 | Shalev et al. | |
| 2006/0280121 A1* | 12/2006 | Matoba | H04L 63/1458 370/235 |
| 2007/0070987 A1* | 3/2007 | Shibasaki | H04W 76/027 370/352 |
| 2007/0233886 A1 | 10/2007 | Fan | |
| 2012/0218914 A1 | 8/2012 | Tanaka et al. | |
| 2012/0233344 A1 | 9/2012 | Yamaura et al. | |
| 2013/0163455 A1* | 6/2013 | Oguchi | H04W 24/02 370/252 |
| 2015/0264142 A1 | 9/2015 | Yamaura et al. | |

FOREIGN PATENT DOCUMENTS

| | | |
|---|---|---|
| JP | 2008-061223 | 3/2008 |
| JP | 2010-183450 | 8/2010 |
| JP | 2011-186797 | 9/2011 |
| JP | 2012-182551 | 9/2012 |
| JP | 2015-177263 | 10/2015 |
| WO | 2011/033562 | 3/2011 |

OTHER PUBLICATIONS

Koufopavlou, O. G. et al., "Parallel TCP for High Performance Communication Subsystems," Communication for Global Users, including a Communications Theory Mini Conference, Orlando, FL, Dec. 6-9, 1992 [Proceedings of the Global Telecommunications Conference (Globecom)], New York IEEE, vol. 3 of 03, Dec. 6, 1992, pp. 1395-1399.

Extended Search Report dated Aug. 12, 2015 in counterpart European Patent Application No. 15153026.8.

U.S. Appl. No. 14/614,871 of Yamaura et al. filed Feb. 5, 2015.

* cited by examiner

COMMUNICATION APPARATUS, INFORMATION PROCESSOR, COMMUNICATION METHOD, AND COMPUTER-READABLE STORAGE MEDIUM

CROSS-REFERENCE TO RELATED APPLICATIONS

This application is based upon and claims the benefit of priority from Japanese Patent Application No. 2014-050697, filed Mar. 13, 2014; the entire contents of which are incorporated herein by reference.

FIELD

Embodiments described herein relate generally to a communication apparatus, an information processor, a communication method, and a computer-readable storage medium.

BACKGROUND

In recent years, TCP/IP (Transmission Control Protocol/Internet Protocol) has been widely used as a protocol for performing communication among multiple hosts. The process for TCP/IP is performed at the time of reception and at the time of transmission, in accordance with the specification of the protocol, and this process is generally performed by software that operates on a CPU (Central Processing Unit). However, in association with the broadness of network bandwidths in recent years, it has been proposed that the protocol process for TCP/IP be performed by dedicated hardware.

DETAILED DESCRIPTION

According to one embodiment, a communication apparatus comprises a transmission processing unit that transmits a connection establishment request on a predetermined protocol or a connection acceptance response, to a partner apparatus through a network, the connection acceptance response being a response of acceptance of the connection establishment request on the predetermined protocol. The communication apparatus comprises an analyzing unit that analyzes a reception frame received from the network. The communication apparatus comprises a state transition processing unit that transits a connection state to a connection establishment state, when, after the transmission of the connection establishment request, a connection acceptance response from the partner apparatus is detected, or when, after the transmission of the connection acceptance response, an acceptance response from the partner apparatus to the connection acceptance response or the connection acceptance response from the partner apparatus is detected, as a result of the analysis by the analyzing unit, the connection state being contained in connection information that is shared with an external CPU and is used in order to perform a process for the predetermined protocol, the connection establishment state showing that a connection on the predetermined protocol has been established.

Hereinafter, an embodiment of the present invention will be explained.

In the explanation of the embodiment, a PDU (Protocol Data Unit), which is a unit of data transmission through a network, is referred to as a frame in a data link layer, is referred to as a packet in a network layer, and is referred to as a segment or a datagram in a transport layer. Further, a segment in which a bit for a SYN flag in TCP is set to 1 is referred to as a SYN segment, and a segment that is an ACK segment responding to the SYN segment and in which the SYN flag and an ACK flag are set to 1 is referred to as a SNY/ACK segment. Further, a segment in which the ACK flag is set to 1 and the SYN flag is set to 0 is referred to as an ACK segment, a segment in which a FIN flag is set to 1 is referred to as a FIN segment, a segment that is an ACK segment responding to the FIN segment and in which the FIN flag and the ACK flag are set to 1 is referred to as a FIN/ACK segment, and a segment in which an RST flag is set to 1 is referred to as an RST segment.

Figure 1:
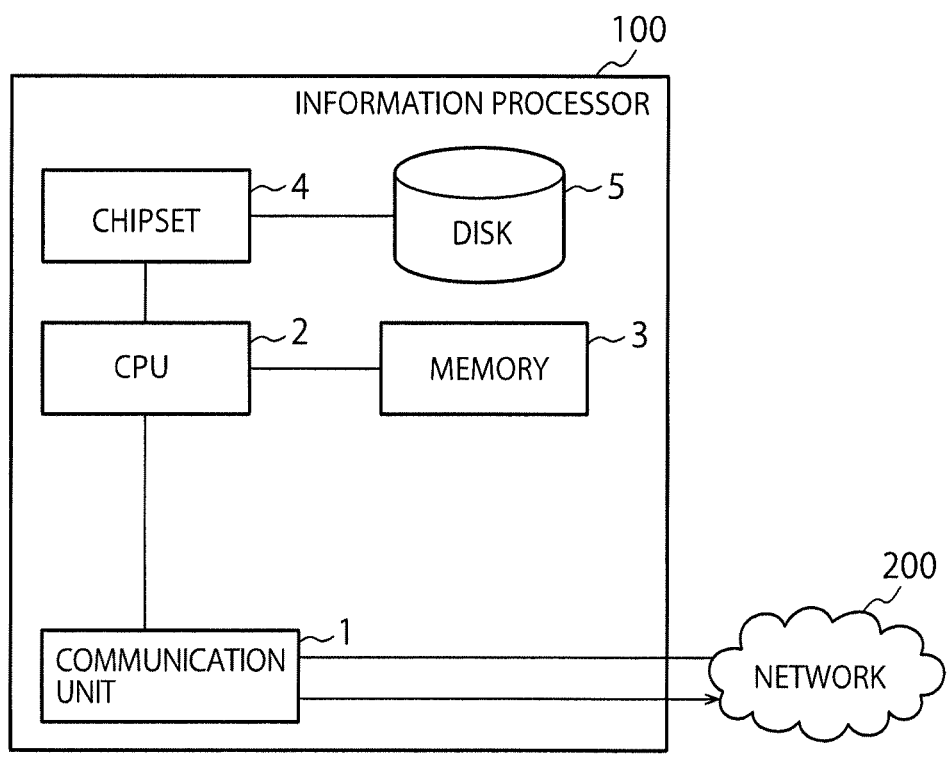
FIG. 1 is a schematic block diagram showing the configuration of an information processor 100 according to the embodiment.

A communication apparatus according to the embodiment establishes a connection before performing a data communication with another communication apparatus through a network. As an example, the communication apparatus according to the embodiment is a server. In the following, the communication apparatus according to the embodiment will be explained using FIG. 1. FIG. 1 is a schematic block diagram showing the configuration of an information processor 100 according to the embodiment. As shown in FIG. 1, the information processor 100 includes a communication unit 1, a CPU 2, a memory 3, a chipset 4 and a disk 5. As shown in FIG. 1, the constituent parts are connected by buses.

The communication unit 1 is connected with the CPU 2, and performs the transmission and reception of data with another communication apparatus through a network 200. In the embodiment, the communication unit 1, which is a PCI (Peripheral Component Interconnect) Express card as an example, is connected with the information processor 100 such that the insertion and removal are possible. Instead of the CPU 2, an offload engine implemented on the PCI Express card performs the protocol process for communication, and thereby, actualizes a quick communication by TCP/IP. The PCI Express card includes a connector for connecting with a PCI Express slot of the information processor 100, and includes a port for communicating with the network 200. Furthermore, the PCI Express card is equipped with a FPGA (Field Programmable Gate Array) and a memory, as an example.

Here, as shown in FIG. 1, the communication unit 1 is directly connected with the CPU 2, but without being limited to this, may be connected with the chipset 4. Concretely, the PCI Express bus may be directly connected with the CPU 2 as shown in FIG. 1, or may be connected through the chipset 4.

In the disk 5, which is connected with the chipset 4, execution files of an operating system, various libraries and other applications are stored. As an example, the disk 5 is a hard disk.

The memory 3 is a memory that allows for the reading and writing by the CPU 2, and as an example, is a random access memory.

The CPU 2 is connected with the communication unit 1, the memory 3 and the chipset 4. The CPU 2 controls the communication unit 1, the memory 3 and the chipset 4.

Figure 2:
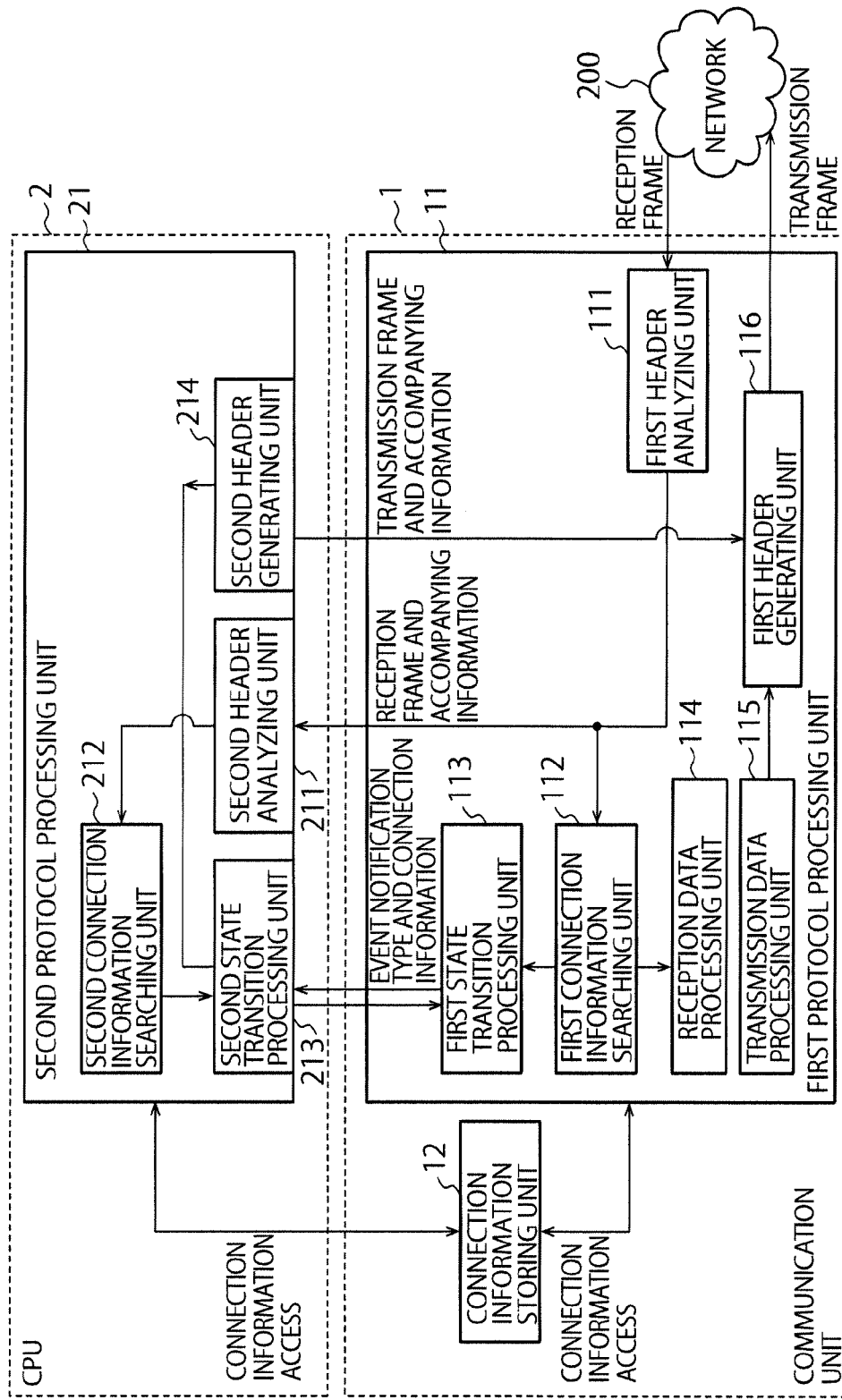
FIG. 2 is a schematic block diagram showing the configuration of the communication unit 1 and the CPU 2 in the embodiment.

Next, the configuration of the communication unit 1 and the CPU 2 will be explained using FIG. 2. FIG. 2 is a schematic block diagram showing the configuration of the communication unit 1 and the CPU 2 in the embodiment. As shown in FIG. 2, the communication unit 1 includes a first protocol processing unit 11 and a connection information storing unit 12.

Further, the CPU 2 reads out a program from the disk 5 through the chipset 4 to the memory 3, to execute the program, and thereby, functions as a second protocol processing unit 21.

The first protocol processing unit 11 is connected with the network 200, and performs the protocol process of transmission and reception frames. Concretely, the first protocol processing unit 11 analyzes the protocol of a reception frame received through the network 200. When a response to a connection establishment request is detected as the result of the analysis, the first protocol processing unit 11 executes a process of establishing the connection. On the other hand, when a connection break request is detected as the result of the analysis, the first protocol processing unit 11 outputs the information corresponding to the above reception frame, to the second protocol processing unit 21.

As an example, the first protocol processing unit 11 is programmed so as to operate in the FPGA mounted on the PCI Express card, which operates as the communication unit 1.

Here, as functions not shown in the figure, necessary functions such as a controller in PCI Express for connecting with a server, an Ethernet® for connecting with the network 200, a memory controller to control the memory are implemented in the FPGA.

As shown in FIG. 2, the first protocol processing unit 11, which is connected with the connection information storing unit 12 by an internal bus, performs a process of a reception frame received from the network 200, and a process of transmitting a frame to the network 200. The first protocol processing unit 11 has a function to sort the reception frame into a control frame and a data frame. In the case of making the judgment of being the control frame, the first protocol processing unit 11 passes the frame to the second protocol processing unit 21 connected by the PCI Express bus, and the second protocol processing unit 21 processes the frame. On the other hand, in the case of making the judgment of being the data frame, the first protocol processing unit 11 writes the acquired data into an area in the memory 3 that is designated by the connection information.

Further, the first protocol processing unit 11 has, as a process on the transmission side, a function to generate an Ethernet® header for a frame to which a transmission instruction is performed from the second protocol processing unit 21, and then transmit it. Further, the first protocol processing unit 11 has, as a process on the transmission side, a function to read data out of an area in the memory 3 that is designated by the connection information, generate a TCP segment, generate a header for IPv4 and Ethernet®, and then transmit it to the network 200.

The connection information storing unit 12 stores the connection information that is shared between the first protocol processing unit 11 and the second protocol processing unit 21 when the protocol process is performed. As an example, the connection information storing unit 12 is actualized in a memory (not shown in the figure) on the PCI Express card that operates as the communication unit 1.

The second protocol processing unit 21 is configured by the hardware different from the first protocol processing unit 11. The second protocol processing unit 21 acquires the control frame sorted by the first protocol processing unit 11, and performs the protocol process of the acquired control frame. For example, the second protocol processing unit 21 can access the first protocol processing unit 11 and the connection information storing unit 12, through the PCI Express bus.

The first protocol processing unit 11 includes a first header analyzing unit (analyzing unit) 111, a first connection information searching unit 112, a first state transition processing unit 113, a reception data processing unit 114, a transmission data processing unit 115, and a first header generating unit (transmission processing unit) 116.

The first header analyzing unit 111 analyzes the protocols of the layers of the reception frame received from the network 200. Concretely, the first header analyzing unit 111 supports the protocols of Ethernet®, IPv4 and TCP, and if the reception frame involves these protocols, analyzes the header. For example, the first header analyzing unit 111 analyzes the reception frame received from the network 200, and detects a connection acceptance response to the connection establishment request. Here, the protocol of the transport layer is, for example, TCP, and the connection acceptance response to the connection establishment request is, for example, the SYN/ACK segment in which the SYN flag and ACK flag in TCP are set to 1.

Further, as the control frame, the first header analyzing unit 111 passes, for example, ARP (Address Resolution Protocol) and ICMP (Internet Control Message Protocol) packets, the FIN segment and RST segment in TCP and the like, which cannot be processed by the first header analyzing unit 111, to the second protocol processing unit 21. Thereby, the second protocol processing unit 21 performs a predetermined protocol process to the control frame.

Based on the information analyzed by the first header analyzing unit 111, the first connection information searching unit 112 searches the corresponding connection information from the connection information storing unit 12. For example, when the first header analyzing unit 111 detects the connection acceptance response to the connection establishment request, the first connection information searching unit 112 searches the connection information corresponding to the reception frame from the connection information storing unit 12, based on the result of the analysis by the first header analyzing unit 111. Here, the result of the analysis by the first header analyzing unit 111 involves a source IP address, a destination IP address, a source port number in TCP and a destination port number in TCP, for example.

The first state transition processing unit 113 performs a process of transiting the connection state contained in the connection information that is searched and obtained by the first connection information searching unit. In more detail, as the result of the analysis by the first header analyzing unit 111, when the connection acceptance response from the partner apparatus is detected after the transmission of the connection establishment request, or when an acceptance response from the partner apparatus to the connection acceptance response or the connection acceptance response from the partner apparatus is detected after the transmission of the connection acceptance response, the first state transition processing unit 113 transits the connection state contained in the connection information that is shared with the external CPU and is used in order to perform a process for the predetermined protocol, to a connection establishment state showing that the connection on the predetermined protocol has been established. As an example thereof, the first state transition processing unit 113 transits the connection state contained in the connection information that is searched and obtained by the first connection information searching unit 112, from a state of waiting for the connection acceptance response to the connection establishment request, to a connection establishment state.

When the connection state is the connection establishment state (ESTABLISHED), the reception data processing unit 114 writes the received data in a data area designated by the connection information.

The transmission data processing unit 115 reads data out of a data area designated in the connection information.

Further, the transmission data processing unit 115 transmits the connection establishment request on the predetermined protocol, or the connection acceptance response, which is a response of acceptance of the connection establishment request on the predetermined protocol, to the partner apparatus through the network 200.

The first header generating unit 116 makes the TCP segment of the data from the transmission data processing unit 115, and performs the process for IPv4 and Ethernet® to transmit it. For example, it is also possible that the first header generating unit 116 performs only the process for Ethernet® to the frame passed from the second protocol processing unit 21.

Here, the first header analyzing unit 111, the first connection information searching unit 112, the first state transition processing unit 113, the first header generating unit 116, the reception data processing unit 114 and the transmission data processing unit 115 can all access the connection information storing unit 12 by the internal bus.

The second protocol processing unit 21 includes a second header analyzing unit 211, a second connection information searching unit 212, a second state transition processing unit 213, and a second header generating unit 214.

The second header analyzing unit 211 performs processes such as the analysis of the protocol of each layer of the control frame received from the first protocol processing unit 11.

Based on the analysis result by the second header analyzing unit 211, the second connection information searching unit 212 searches the connection information corresponding to the above control frame, in the connection information storing unit 12. For example, when the second header analyzing unit 211 detects that the control frame is the connection establishment request, the second connection information searching unit 212 searches the connection information that is in a connection establishment request wait state.

The second state transition processing unit 213 transits the connection state contained in the connection information that is searched and obtained by the second connection information searching unit 212.

The second header generating unit 214 creates a transmission frame responding to the reception frame, and instructs the first protocol processing unit 11 to transmit the transmission frame. For example, when the second connection information searching unit 212, by the search, has found the connection information that is in the connection establishment request wait state, the second header generating unit 214 generates a transmission frame responding to the connection establishment request, and makes the first protocol processing unit 11 transmit the generated transmission frame.

Figure 3:
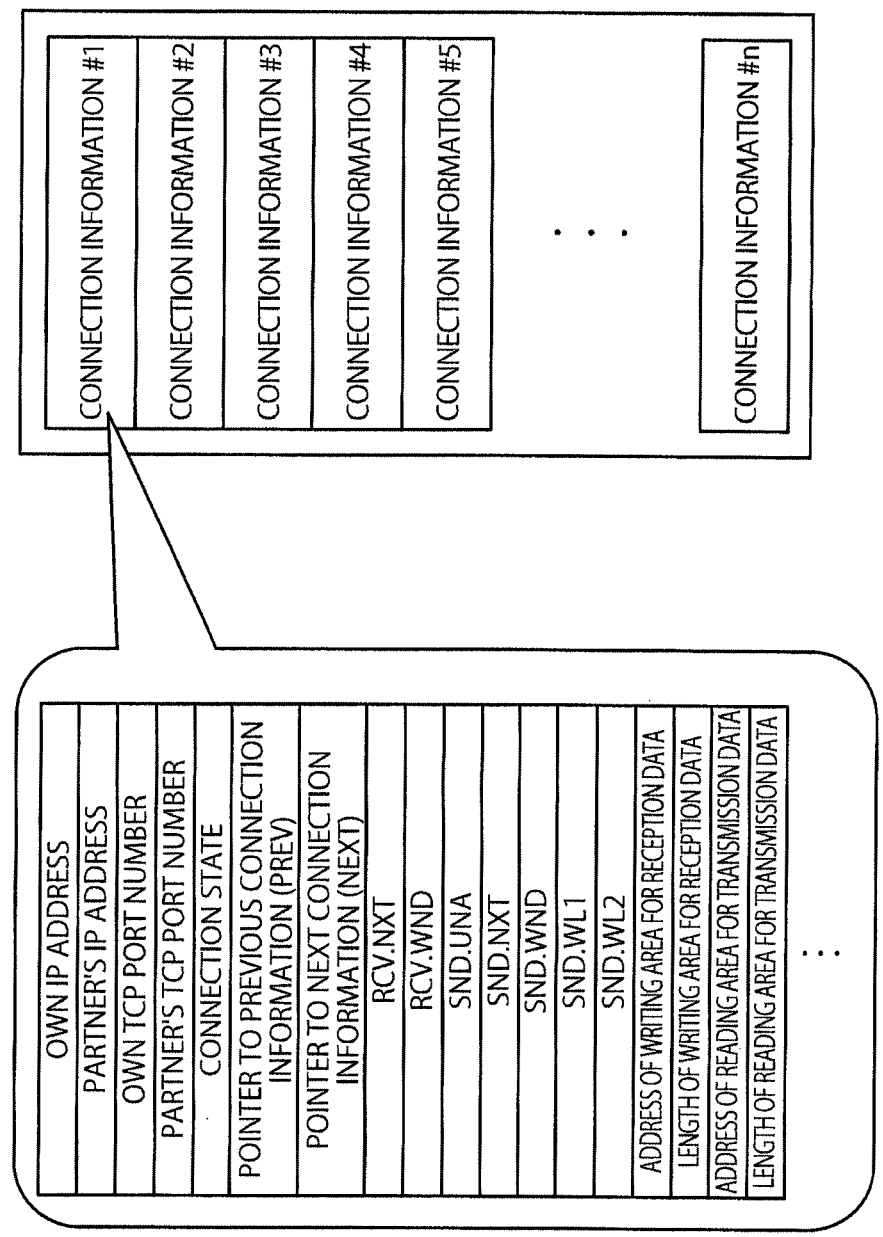
FIG. 3 is an example of the connection information to be stored in the connection information storing unit 12.

Next, the connection information to be stored in the connection information storing unit 12 will be explained using FIG. 3. FIG. 3 is an example of the connection information to be stored in the connection information storing unit 12. The connection information to be stored in the connection information storing unit 12 is each constituted by elements shown in FIG. 3. In addition to its own IP address, the partner's IP address, its own port number and the partner's port number for determining the connection, each connection information has the connection state, a pointer to the previous connection information (PREV), a pointer to the next connection information (NEXT), "RCV.NXT" (a sequence number that is expected to be received next), "RCV.WND" (a reception widow size), "SND.UNA" (a sequence number for which an acknowledgement is not yet performed), "SND.NXT" (a sequence number that is used at the time of the next transmission), "SND.WND" (a transmission window size), "SND.WL1" (a sequence number of the last window update), "SND.WL2" (an acknowledgement number of the last window update), the address of a writing area for reception data, the length of the writing area for the reception data, the address of a reading area for transmission data, the length of the reading area for the transmission data, and the like.

Naturally, there is no need to be limited to this, and for example, other information defined in RFC793 may be contained, or optionally defined information such as a SACK (Selective ACKnowledgement), the partner's MAC (Media Access Control) address or TOS (Type Of Service) value, a TTL (Time To Live) value, or the like may be contained. Here, RFC793 is the transmission control protocol DARPA internet program protocol specification.

The information that the first protocol processing unit 11 writes for initialization is its own IP address, the partner's IP address, its own port number, the partner's port number, the connection state, the partner's sequence number, and the partner's window size, which are taken out of the reception frame. Naturally, the first protocol processing unit 11 may write a window scaling value, a time stamp and the like, which are TCP options other than them.

Next, the flow of the process in the first protocol processing unit 11 will be explained using FIGS. 4A to 4E. FIGS.

4A to 4E are flowcharts showing an example of the flow of the process in the first protocol processing unit 11. (Step S101) Firstly, the first protocol processing unit 11 receives a frame. This frame is referred to as a reception frame, hereinafter.

(Step S102) Next, the first header analyzing unit 111 performs the analysis process for Ethernet®. Concretely, the first header analyzing unit 111 performs the head detection of the reception frame, and the verification of the FCS (Frame Check Sequence), and thereby, performs the detection of whether the destination MAC address indicates its own apparatus, the detection of the ID indicating the upper layer protocol from the type filed, and the like. As the result of the verification of the FCS, whether the frame is corrupted is detected.

(Step S103) Next, the first header analyzing unit 111 judges whether the destination MAC address indicates its own apparatus and the frame is uncorrupted. In the case where the destination MAC address indicates its own apparatus and the frame is uncorrupted, the first header analyzing unit 111 proceeds to step S104. On the other hand, in the case where the destination MAC address does not indicate its own apparatus, or in the case where the reception frame is corrupted (NO), the reception frame is discarded by the first header analyzing unit 111.

Figure 4A:
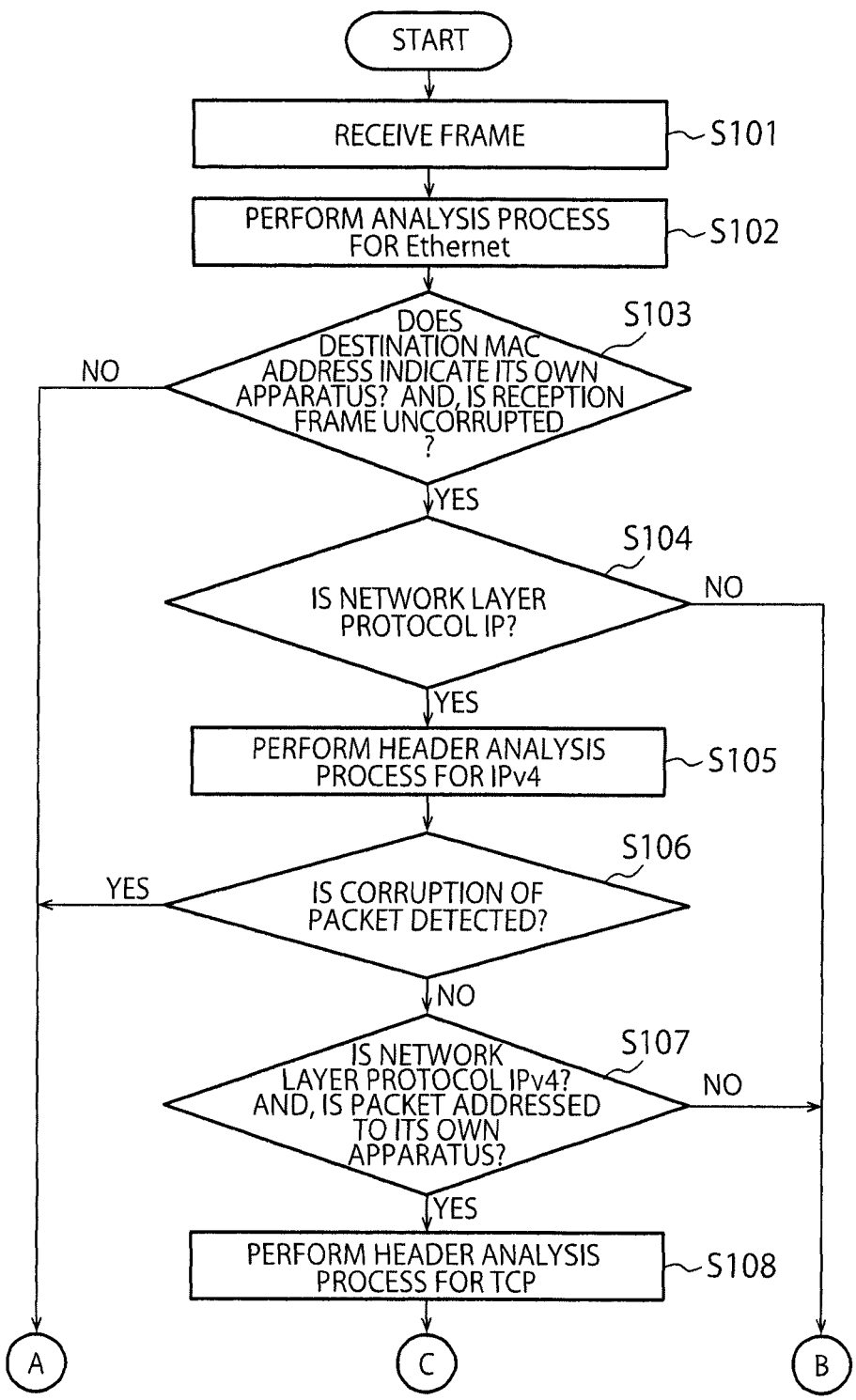
FIG. 4A is a flowchart showing an example of the flow of the process in the first protocol processing unit 11.
Figure 4B:
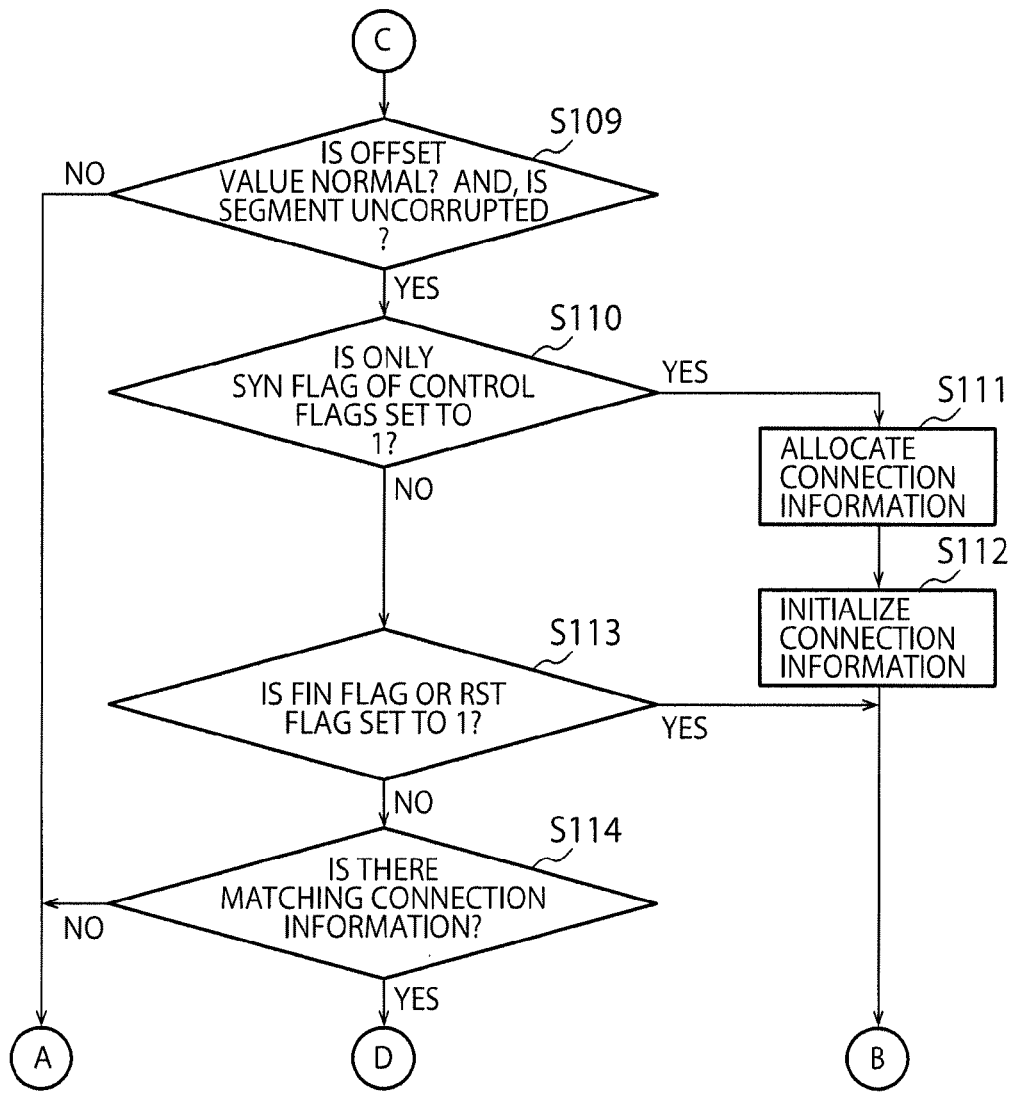
FIG. 4B is a continued flowchart FIG. 4A.
Figure 4C:
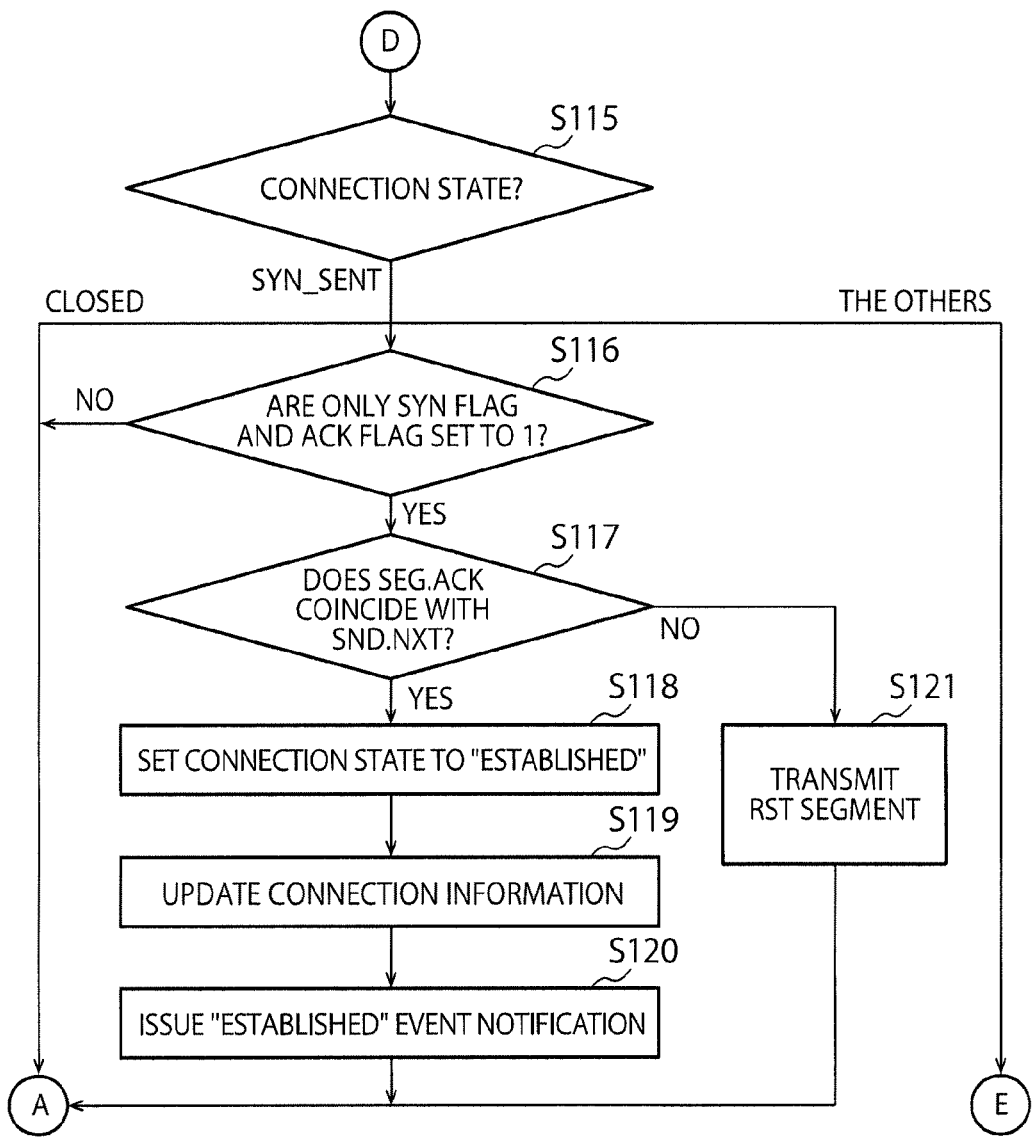
FIG. 4C is a continued flowchart FIG. 4B.
Figure 4D:
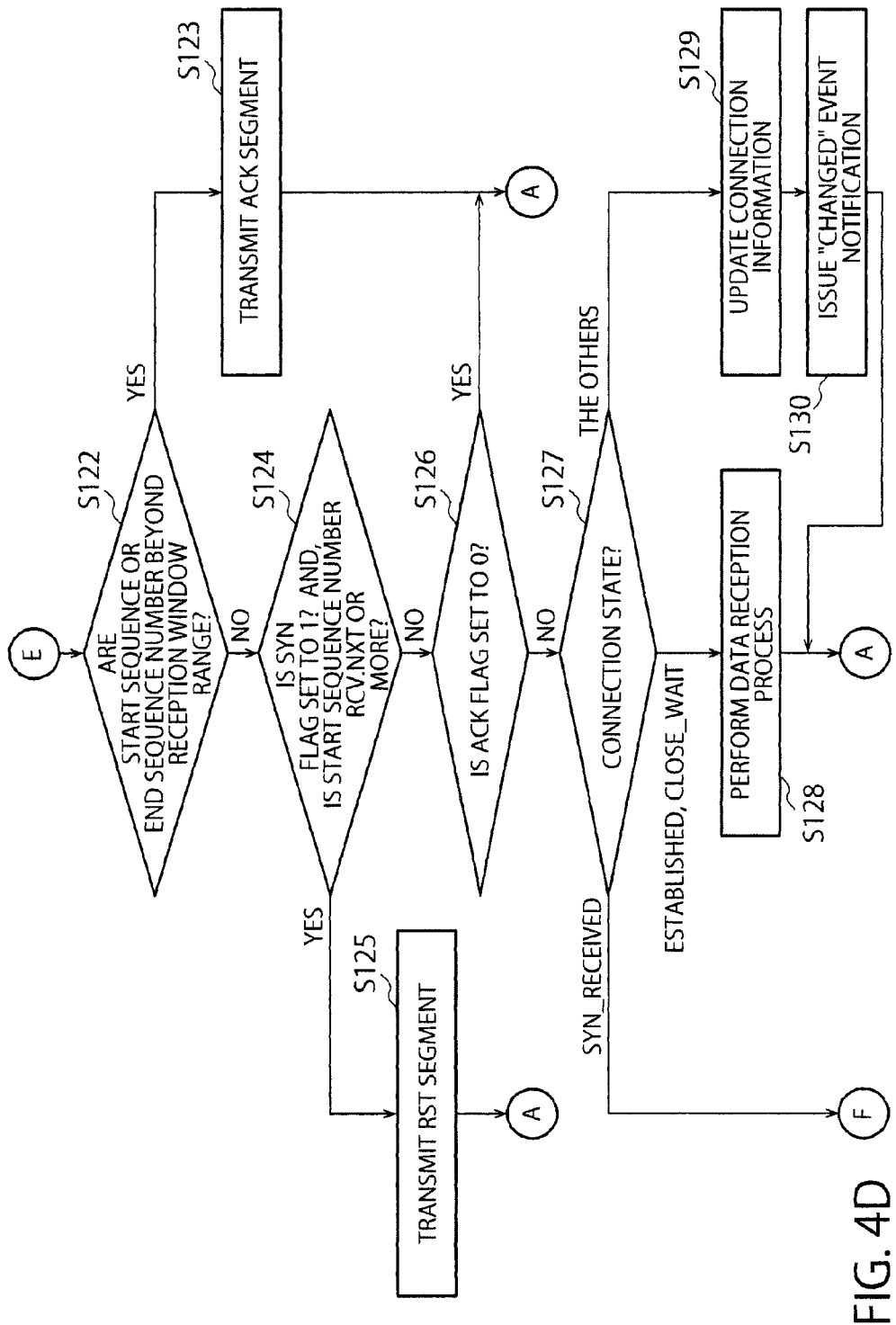
FIG. 4D is a continued flowchart FIG. 4C.
Figure 4E:
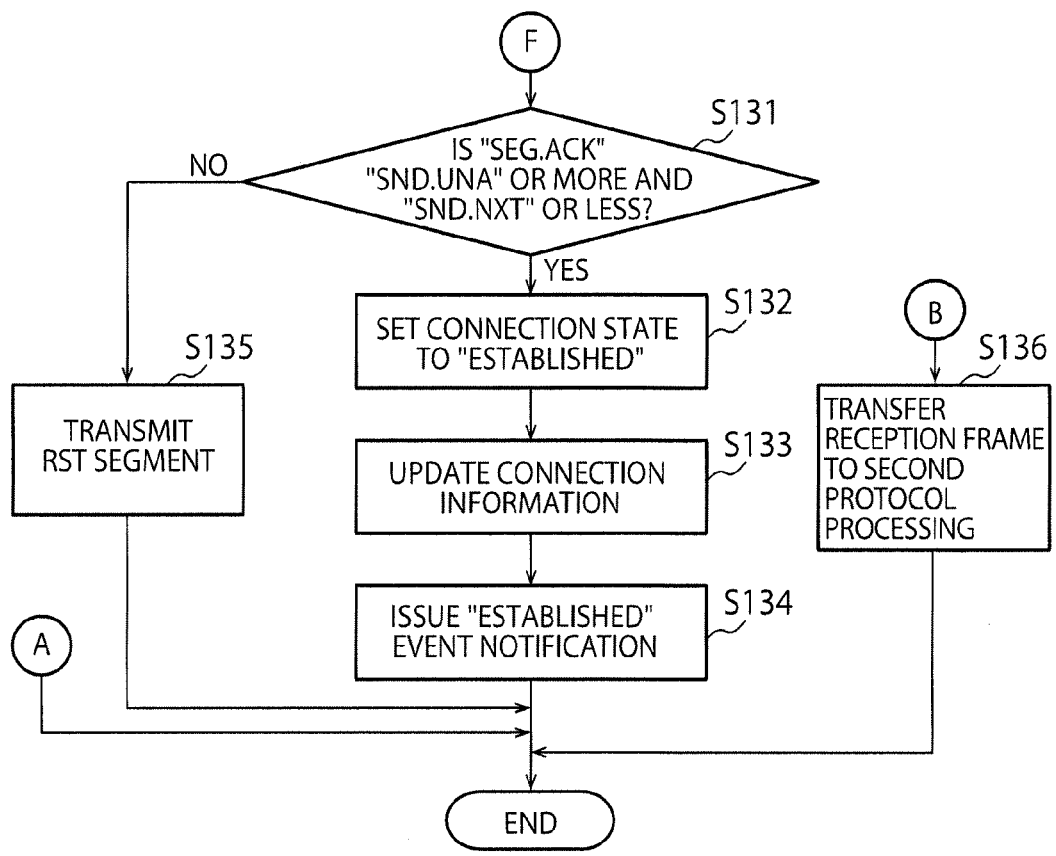
FIG. 4E is a continued flowchart FIG. 4D.

(Step S104) In the case of judging that the destination MAC address indicates its own apparatus and the frame is uncorrupted in step S103, whether the network layer protocol is IP is judged. In the case where the network layer protocol is IP (YES), the first header analyzing unit 111 proceeds to step S105. On the other hand, in the case where the network layer protocol is not IP (NO), the reception frame is transferred to the second protocol processing unit 21 by the first header analyzing unit 111 (FIG. 4E: step S136).

(Step S105) In the case of judging that the network layer protocol is IP in step S104, the first header analyzing unit 111 performs the header analysis process for IPv4. Concretely, the first header analyzing unit 111 performs the verification of the header checksum, the check of the version field, the detection of the header length, the check of the packet length, the detection and reassembling process of fragments, the detection of the upper layer protocol number, and the confirmation of whether the destination IP address indicates its own apparatus. By the inspection result of the header length and packet length and the verification of the header checksum, whether the packet is corrupted is detected.

(Step S106) The first header analyzing unit 111 judges whether the corruption of the packet is detected. In the case of detecting the corruption of the packet (YES), the first header analyzing unit 111 discards the packet. For example, if the corruption of the packet is detected by the inspection result of the header length and packet length and the verification of the header checksum, the packet is discarded. On the other hand, in the case of not detecting the corruption of the packet (NO), the first header analyzing unit 111 proceeds to step S107.

(Step S107) From the inspection result of the version field, the first header analyzing unit 111 judges whether the network layer protocol is IPv4, and the destination IP address is the IP address of its own apparatus, that is, it is a packet addressed to its own apparatus. In the case where the network layer protocol is IPv4 and the destination IP address is the IP address of its own apparatus, the first header analyzing unit 111 proceeds to step S108. On the other hand, in the case where the network layer protocol is other than IPv4, or in the case where the destination IP address does not indicate its own apparatus (NO), the reception frame is passed, as the control frame, to the second protocol processing unit 21 by the first header analyzing unit 111.

(Step S108) If the transport layer protocol, which is the upper layer, is TCP, the first header analyzing unit 111 performs the TCP header analysis process. The first header analyzing unit 111 performs the verification of the checksum, and acquires the source port number, the destination port number, the sequence number, the acknowledgement number, the offset, the control flags, and the window size. Further, as the result of the verification of the checksum, the presence or absence of the corruption of the segment is detected.

(Step S109) Next, the first header analyzing unit 111 judges whether the offset value is normal and the segment is uncorrupted. In the case where the offset value is normal and the segment is uncorrupted (YES), the first header analyzing unit 111 proceeds to step S110. On the other hand, in the case where the abnormality of the offset or the corruption of the segment is detected (NO), the segment is discarded by the first header analyzing unit 111.

(Step S110) As the result of the verification of the checksum in step S109, in the case of judging that the offset value is normal and the segment is uncorrupted, the first header analyzing unit 111 analyzes the control flags of the acquired TCP segment. The first header analyzing unit 111 judges whether only the SYN flag of the control flags is set to 1. In the case where only the SYN flag is set to 1 and the other flags are set to 0 (YES), the first header analyzing unit 111 judges that the segment is the connection establishment request, and proceeds to step S111. On the other hand, in the case where the SYN flag is set to 0 and/or another flag is set to 1 (NO), the first header analyzing unit 111 proceeds to step S113.

(Step S111) In the case of judging that only the SYN flag of the control flags is set to 1 in step S110, the first header analyzing unit 111 allocates the connection information, and proceeds to step S112. For example, it is allowable that unused identifiers of the connection information are stocked in a queue of the connection information storing unit 12, and the first connection information searching unit 112 performs a dequeuing at the time of allocating the connection information and performs a queuing at the freeing time.

(Step S112) Next, the first header analyzing unit 111 performs the initialization of the connection information. The initialization of the connection information is to write the IP address, the port number, the connection state and the like in the connection information, from the analysis result of the received frame.

The first header analyzing unit 111 stores the start address of the connection information in the memory 3, as the accompanying information of the frame, and transfers the reception frame to the second protocol processing unit 21.

(Step S113) Further, the first header analyzing unit 111 judges whether the FIN flag or RST flag of the control flags in TCP is set to 1. In the case where the FIN flag or RST flag of the control flags in TCP is set to 1 (YES), the first header analyzing unit 111 passes the TCP segment to the second protocol processing unit 21, as the control frame. On the other hand, in the case where neither of the FIN flag and RST flag of the control flags in TCP is set to 1 (NO), the first header analyzing unit 111 proceeds to step S114.

(Step S114) Next, the first connection information searching unit 112 searches the connection information from the connection information storing unit 12, with respect to the TCP segments other than the above-described TCP segment.

In the case where there is matching connection information, the first connection information searching unit 112 proceeds to step S115. On the other hand, in the case where there is no matching connection information (NO), the reception frame is discarded by the first connection information searching unit 112. Thus, if the matching connection information is not found, the process of the segment is not performed.

In the search of the connection information, the first connection information searching unit 112 searches the connection information that matches in all of the source IP address, the destination IP address, and the source port number and destination port number in TCP. On this occasion, for the speed-up of the process, the first connection information searching unit 112 uses, for example, a hash table stored in the connection information storing unit 12 while adopting the IP address or the port number as a key, and thereby, the speed-up of the search is performed.

(Step S115) In the case where the matching connection is found in step S114, the process branches depending on the connection state. First, in the case where the connection state is a closed state (CLOSED), the first connection information searching unit 112 ends the process without performing the process of the segment.

(Step S116) On the other hand, in the case where the connection state is a state of waiting for the connection acceptance response to the connection establishment request (SYN_SENT), whether to be a segment in which only the SYN flag and ACK flag are set to 1 is judged. In the case of being a segment in which only the SYN flag and ACK flag are set to 1 (YES), the first connection information searching unit 112 proceeds to step S117. On the other hand, in the case where the segment corresponds to at least one of a segment in which the SYN flag is set to 0, a segment in which the ACK flag is set to 0, and a segment in which a flag other than the SYN flag and the ACK flag is set to 1 (NO), the reception frame is discarded.

(Step S117) In the case of making the judgment of being a segment in which only the SYN flag and the ACK flag are set to 1 in step S116, the first connection information searching unit 112 judges whether the acknowledgement number (SEG.ACK) of the TCP segment coincides with "SND.NXT" of the connection information. In the case where the acknowledgement number (SEG.ACK) of the TCP segment coincides with "SND.NXT" of the connection information (YES), the first connection information searching unit 112 proceeds to step S118. On the other hand, in the case where the acknowledgement number (SEG.ACK) of the TCP segment does not coincide with "SND.NXT" of the connection information (NO), it proceeds to step S121.

(Step S118) In the case of judging that the acknowledgement number (SEG.ACK) of the TCP segment coincides with "SND.NXT" of the connection information in step S117, the first connection information searching unit 112 sets the connection state to "ESTABLISHED".

(Step S119) Next, the values of "SND.UNA", "RCV.WND" and others of the connection information are updated.

(Step S120) Next, the first state transition processing unit 113 performs an "ESTABLISHED" event notification for notifying the second protocol processing unit 21 that the connection state has been put into the connection establishment (ESTABLISHED) state.

(Step S121) In the case of judging that the acknowledgement number (SEG.ACK) of the TCP segment does not coincide with "SND.NXT" of the connection information in step S117, the first header generating unit 116 transmits an RST segment to the partner apparatus for the above reception frame, through the network 200.

(Step S122) In the case where the connection state is other than "CLOSED" and "SYN_SENT", the first connection information searching unit 112 judges whether the sequence number or end sequence number (the maximal sequence number contained in the segment, which also takes into account the flags and the like) of the received segment is beyond the range of the reception window. In the case where the sequence number or end sequence number of the received segment is beyond the range of the reception window (YES), the first connection information searching unit 112 proceeds to step S123. On the other hand, in the case where the sequence number or end sequence number of the received segment is not beyond the range of the reception window (NO), the first connection information searching unit 112 proceeds to step S124.

(Step S123) In the case of judging that the sequence number or end sequence number of the received segment is beyond the range of the reception window in step S122, the first header generating unit 116 transmits the ACK segment to end the process.

(Step S124) The first connection information searching unit 112 judges whether the SYN flag is set to 1 and the start sequence number is "RCV.NXT" or more. In the case where the SYN flag is set to 1 and the start sequence number is "RCV.NXT" or more (YES), the first connection information searching unit 112 proceeds to step S125. On the other hand, in at least either of the case where the SYN flag is not set to 1 and the case where the start sequence number is less than "RCV.NXT" (NO), it proceeds to step S126.

(Step S125) In the case of judging that the SYN flag is set to 1 and the start sequence number is "RCV.NXT" or more in step S124, the first header generating unit 116 transmits the RST segment to end the process.

(Step S126) The first connection information searching unit 112 judges whether the ACK flag of the segment is set to 0. In the case where the ACK flag is set to 0 (YES), the first connection information searching unit 112 ends the process. In the case where the ACK flag is not set to 0 (NO), the first connection information searching unit 112 proceeds to step S127.

(Step S127) The first state transition processing unit 113 performs a different process for each connection state.

(Step S128) In the case where the connection state is "ESTABLISHED" or "CLOSE_WAIT", the reception data processing unit 114 writes the corresponding data, in an area designated by the address and length of the writing area for the reception data in the connection information, and updates the connection information. Further, the first header generating unit 116 transmits the ACK segment, which shows that the data have been received, to the partner apparatus.

(Step S129) In the case where the connection state is the others, the first state transition processing unit 113 updates the connection information such as "SND.UNA".

(Step S130) Next, the first state transition processing unit 113 performs, to the second protocol processing unit 21, a "CHANGED" event notification, which shows that there is a probability of change in the connection state.

(Step S131) In the case where the connection state is "SYN_RECEIVED", the first state transition processing unit 113 judges whether the acknowledgement number (SEG.ACK) of the segment is "SND.UNA" or more and "SND.NXT" or less. In the case where the acknowledgement number of the segment is "SND.UNA" or more and "SND.NXT" or less, the first state transition processing unit 113 proceeds to step S132. On the other hand, in the case where the acknowledgement number of the segment is less than "SND.UNA" or exceeds "SND.NXT" (NO), the first state transition processing unit 113 proceeds to step S135.

(Step S132) In the case of judging that the acknowledgement number of the segment is "SND.UNA" or more and "SND.NXT" or less in step S131, the first state transition processing unit 113 sets the connection state to "ESTABLISHED".

(Step S133) Next, the first state transition processing unit 113 updates the other connection information such as "SND.UNA".

(Step S134) Next, the first state transition processing unit 113 performs the "ESTABLISHED" event notification to the second protocol processing unit 21.

(Step S135) In the case of judging that the acknowledgement number of the segment is less than "SND.UNA" or exceeds "SND.NXT" in step S131, the first header generating unit 116 transmits the RST segment to the partner apparatus, and ends the process.

(Step S136) The first header analyzing unit 111 transfers the reception frame to the second protocol processing unit 21.

Figure 5:
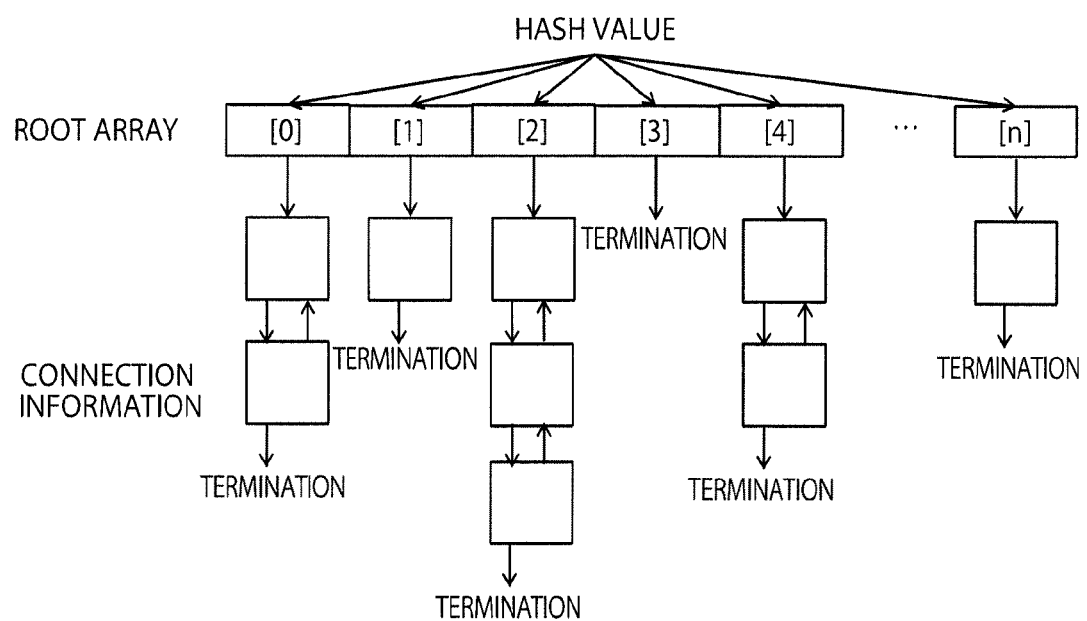
FIG. 5 is a diagram for explaining a hash table implementation method according to the embodiment.

Next, a hash table implementation method will be explained using FIG. 5. FIG. 5 is a diagram for explaining a hash table implementation method according to the embodiment. There are some hash table implementation methods. As shown in FIG. 5, in a chain method, an area for a root array is allocated, and the connection information has pointers indicating the previous connection information and the next connection information, for making a list among pieces of connection information. Then, pieces of connection information having the same hash value are linked from the root array. Thereby, the first connection information searching unit 112 can follow the pieces of connection information having the same hash value, from the root array.

As for the linking and deletion to the hash table, the first protocol processing unit 11 and the second protocol processing unit 21 perform the linking to the hash table, after allocating the connection information, and the second protocol processing unit 21 performs the deletion from the hash table, before freeing the connection.

Here, the hash table may be divided and used for each connection state. The area for the hash table may be provided in the connection information storing unit 12, or the first protocol processing unit 11 may separately include a storing unit for the hash table.

Figure 6:
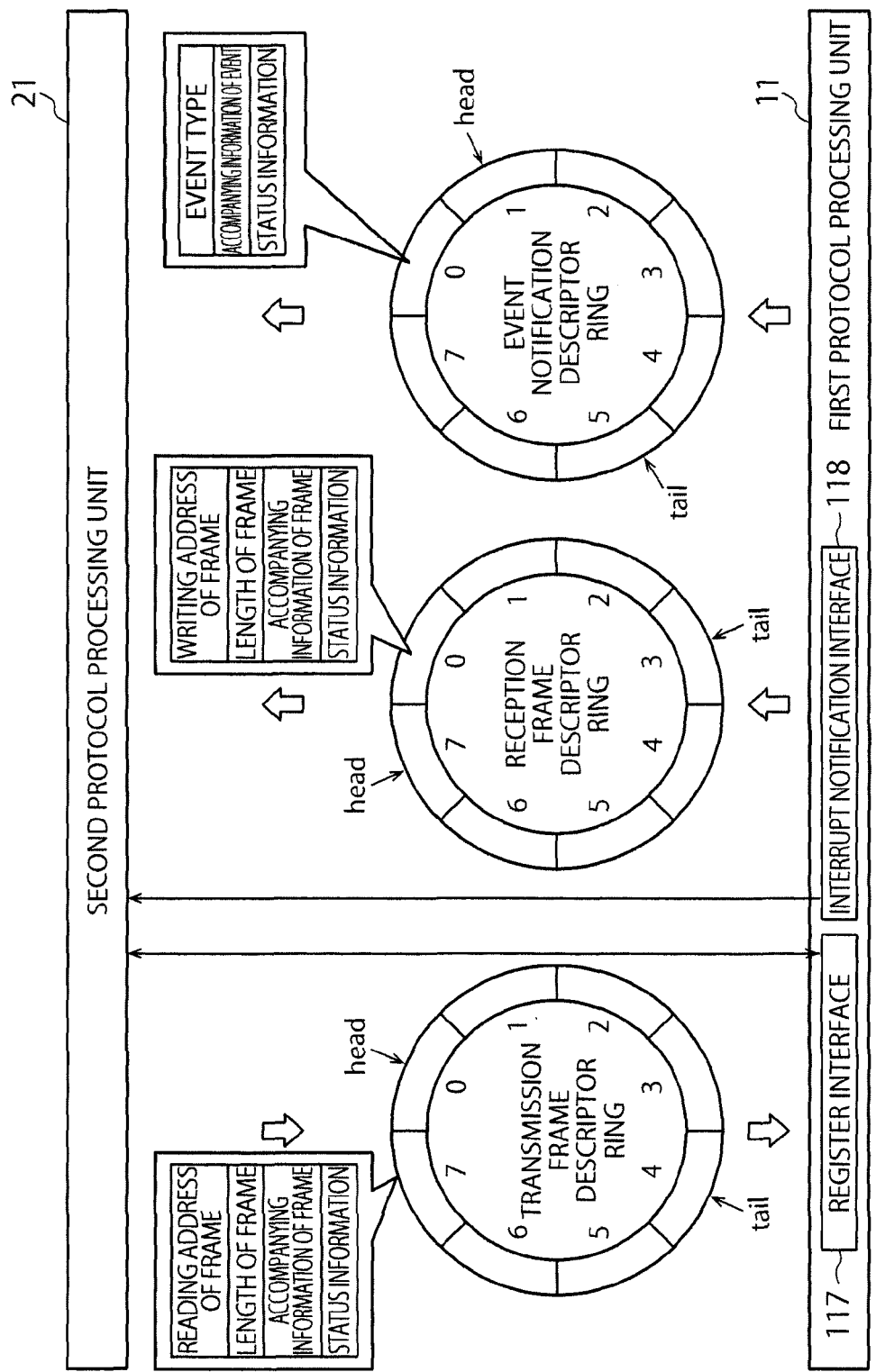
FIG. 6 is a conceptual diagram of a transmission frame descriptor ring, a reception frame descriptor ring and an event notification descriptor ring that are stored in the memory 3.

Next, a method for transmitting and receiving a frame and the accompanying information of the frame between the first protocol processing unit 11 and the second protocol processing unit 21, and a method for transferring an event notification and the accompanying information of the event from the first protocol processing unit 11 to the second protocol processing unit 21 will be explained using FIG. 6. FIG. 6 is a conceptual diagram of a transmission frame descriptor ring, a reception frame descriptor ring and an event notification descriptor ring that are stored in the memory 3.

In the transfer of a frame and the accompanying information from the first protocol processing unit 11 to the second protocol processing unit 21, the reception frame descriptor ring, which is configured by a ring buffer, is used.

On the other hand, in the transfer of a frame from the second protocol processing unit 21 to the first protocol processing unit 11, the transmission frame descriptor ring, which is similarly configured by a ring buffer, is used.

Further, for the event notification from the first protocol processing unit 11 to the second protocol processing unit 21, the event notification descriptor ring is used. As an example, these descriptor rings are disposed in the memory 3 of the information processor 100. The rings each of which has eight descriptors are illustrated here. However, in practice, there are as many descriptors as necessary for absorbing the processing speed difference between the first protocol processing unit 11 and the second protocol processing unit 21. The respective descriptor rings are controlled, using values "head" and "tail".

(About a Method for Transferring a Received Frame and the Accompanying Information)

First, a method for transferring a received frame and the accompanying information from the first protocol processing unit 11 to the second protocol processing unit 21 will be explained. Each descriptor contained in the reception frame descriptor ring is configured by the writing address of a frame, the length of the frame, the accompanying information of the frame, and the status information. The status information contains a bit showing the information on an error that occurs in the first protocol processing unit 11, and a DONE bit showing that the first protocol processing unit 11 has completed the writing to a descriptor containing the status information in question.

The first protocol processing unit 11 manages the writing to a descriptor, using the two variables "head" and "tail". For example, the first protocol processing unit 11 decides that the writing is possible for the descriptors of "head" to "tail-1". Here, the maximum of the number of descriptors to which the first protocol processing unit 11 can perform the writing is the maximum descriptor number −1, and in this example, is 7. The situation in which "head" and "tail" coincide shows that there is no descriptor to which the first protocol processing unit 11 can perform the writing.

The values of "head" and "tail" are managed by each of the first protocol processing unit 11 and the second protocol processing unit 21. The first protocol processing unit 11 further includes a register interface 117 for mutually performing the notification of the values of "head" and "tail", or for mutually performing the notification of the start address of the descriptor ring and the length of a descriptor. Also, it further includes an interrupt notification interface 118 for notifying the second protocol processing unit 21 that there is a descriptor to be processed.

As an initialization process, the second protocol processing unit 21 allocates an area necessary for configuring the reception frame descriptor ring, in the memory 3 of the information processor 100, and sets the start address of the reception frame descriptor ring and the length of a descriptor, in the first protocol processing unit 11, through the above-described register interface 117.

Next, as an initialization process for the descriptors contained in the reception frame descriptor ring, the second protocol processing unit 21 allocates areas enough to store received frames, in the memory of the information processor 100, respectively, and sets the addresses as the writing addresses of frames. On this occasion, the second protocol processing unit 21 clears the lengths of frames, the accompanying information of frames and the status information to 0. After the process finishes for all the descriptors contained in the reception frame descriptor ring, the second protocol processing unit 21 clears its own managing "head" to 0, and sets the "tail" to 7. Then, the second protocol processing unit 21 instructs the first protocol processing unit 11 to set the same values as the values of "head" and "tail" that are managed by the first protocol processing unit 11.

In the wake of this, the first protocol processing unit 11 starts the operation, and reads the information (hereinafter, referred to as descriptor information) contained in the descriptor at the "head" position in the case of judging that a received reception frame is passed to the second protocol processing unit 21 as the control frame. Then, the first protocol processing unit 11 acquires the writing address of the frame contained in the read descriptor information. The first protocol processing unit 11 writes the control frame to the writing address in the memory of the information processor 100, and sets the length of the written control frame, as the "length of the frame" contained in the descriptor.

On this occasion, if there is connection information associated with the control frame, the first protocol processing unit 11 writes the start address of the connection information, in an area for the connection information, which is in a part of the accompanying information of the frame. If there is no particularly associated connection information, the first protocol processing unit 11 writes a special value such as 0.

When the writing of the control frame and the writing for the other parts of the descriptor contained in the reception frame descriptor ring are completed, the first protocol processing unit 11 writes 1 to the DONE bit of the status information, and the first protocol processing unit 11 performs an interrupt notification to the second protocol processing unit 21 through the interrupt notification interface 118. Thereafter, the first protocol processing unit 11 increments, by 1, the value of "head" that is managed by the first protocol processing unit 11, and performs the process of the next control frame at the position of the new "head", as long as "head" does not catch the position of "tail-1".

Once receiving the interrupt notification from the first protocol processing unit 11 through the interrupt notification interface 118, the second protocol processing unit 21 reads the DONE bit of the status information of the descriptor that is indicated by its own managing "tail". At this time, if the DONE bit is set to 0, the second protocol processing unit 21 does not perform any process.

On the other hand, if the DONE bit is set to 1, this shows that the first protocol processing unit 11 has completed the process for the descriptor. Therefore, the second protocol processing unit 21 acquires, as the reception frame, an area in the memory 3 that is indicated by the writing address of the frame and that has a length indicated by the length of the frame. Further, as necessary, the second protocol processing unit 21 performs the process, using the connection information contained in the accompanying information of the frame. As for the detail of the process to be performed here, an operation example will be shown and explained later.

When the process of the frame is completed, the DONE bit of the status bits is set to 0, the value of its own managing "tail" is incremented by 1, and the value of "tail" is reflected in the value of "tail" of the first protocol processing unit 11. Thereby, the first protocol processing unit 11 can newly perform the writing to the descriptor for which the process is completed. The second protocol processing unit 21 repeats this operation, whenever an interrupt occurs. Here, as the writing frame address, a memory area allocated newly each time may be set.

(About a Method for Transferring a Frame Intended to be Transmitted)

Next, a method for transferring a frame intended to be transmitted from the second protocol processing unit 21 to the first protocol processing unit 11 will be explained. Each descriptor contained in the transmission frame descriptor ring is configured by a reading address of a frame, the length of the frame, the accompanying information of the frame, and the status information. Similarly to the reception frame descriptor ring, the status information contains a bit showing the information on an error, and a DONE bit. The use method of "head" and "tail" is also the same as the reception side, and therefore, the explanation is omitted here.

Here, although the number of the interrupt notification interface 118 is one in FIG. 6, the interface may be appropriately provided separately for each type of the descriptor rings.

As an initialization process, the second header generating unit 214 of the second protocol processing unit 21 allocates an area necessary for configuring the descriptor ring, in the memory 3 of the information processor 100, and sets the start address of the descriptor ring and the length of a descriptor, in the first protocol processing unit 11, through the above-described register interface 117. Next, the second header generating unit 214 sets the values of its own managing "head" and "tail" to 0, and instructs the first header generating unit 116 to set also the values of "head" and "tail" that are managed by the first protocol processing unit 11, to 0.

When a frame is attempted to be transmitted, the second header generating unit 214 sets the address and length of the frame that is attempted to be transmitted, as the reading address of a frame and the length of the frame for the descriptor at the position of its own managing "tail", respectively. Further, on this occasion, for example, if a value is intended to be stored in the connection information as the information accompanying the frame, the second header generating unit 214 writes it in the accompanying information of the frame. Then, the second header generating unit 214 clears all the status information to 0, and thereafter, increments the value of "tail" by 1, to perform the notification of the value of "tail" to the first protocol processing unit 11.

Once receiving this, the first header generating unit 116 of the first protocol processing unit 11 acquires the reading address of the frame, the length of the frame and the accompanying information of the frame, from the descriptor that is indicated by "head", performs the process in accordance with the accompanying information of the frame, and thereafter, transmits the frame to the network 200. Then, the first header generating unit 116 rewrites the DONE bit of the status information of the descriptor to 1, increments the value of its own managing "head" by 1, and thereafter, performs the interrupt notification through the interrupt notification interface 118.

Once receiving the interrupt notification, the second header generating unit 214 of the second protocol processing unit 21 checks the DONE bit of the descriptor at the position of its own managing "head", and, if this is set to 0, does not perform any process. If this is set to 1, the first protocol processing unit 11 has completed the process, and therefore, the second header generating unit 214 performs the process of freeing the memory for the frame that has been transmitted, and increments the value of its own managing "head" by 1.

(About a Method of the Event Notification)

Next, a method of the event notification from the first protocol processing unit 11 to the second protocol processing unit 21 will be explained. The event notification from the first protocol processing unit 11 to the second protocol processing unit 21 is performed using the event notification descriptor ring. Here, "head" and "tail" are the same as the reception frame descriptor ring, and therefore, the explanation is omitted.

As an initialization process, the second state transition processing unit 213 of the second protocol processing unit 21 allocates an area necessary for configuring the event notification descriptor ring, in the memory 3 of the information processor 100. The second state transition processing unit 213 makes the first protocol processing unit 11 set the start address of the event notification descriptor ring and the length of a descriptor through the above-described register interface 117. Next, as an initialization process for the descriptors, the second protocol processing unit 21 clears all values to 0. After the process finishes for all the descriptors contained in the event notification descriptor ring, the second state transition processing unit 213 clears its own managing "head" to 0, sets "tail" to 7, and instructs the first protocol processing unit 11 to set the same values as the values of "head" and "tail" that are managed by the first protocol processing unit 11.

In the wake of this, the first state transition processing unit 113 of the first protocol processing unit 11 starts the operation. In the case of judging that the event notification is performed to the second protocol processing unit 21, either "ESTABLISHED" or "CHANGED", depending on the connection state, is set as the event type, in the descriptor at the position of "head" contained in the event notification descriptor ring. Concretely, in the case where the connection state of the connection information given as the accompanying information becomes "ESTABLISHED", the first state transition processing unit 113 sets the event type to "ESTABLISHED". On the other hand, in the case where there is a probability that the connection state of the connection information given as the accompanying information changes, the event type is set to "CHANGED".

On this occasion, the first state transition processing unit 113 writes the start address of the connection information associated with the event notification, in the accompanying information of the event notification. After the writing of them finishes, the first state transition processing unit 113 writes 1 to the DONE bit of the status information, and performs the interrupt notification to the second protocol processing unit 21. Thereafter, the first state transition processing unit 113 increments, by 1, the value of "head" that is managed by the first protocol processing unit 11, and performs the process of the next control frame at the position of the new "head", as long as "head" does not catch the position of "tail-1".

Once receiving the interrupt notification from the first state transition processing unit 113 by the interrupt notification interface 118, the second state transition processing unit 213 of the second protocol processing unit 21 reads the DONE bit of the status information of the descriptor that is indicated by its own managing "tail".

Then, if the DONE bit is set to 0, the second protocol processing unit 21 does not any process.

On the other hand, if the DONE bit is set to 1, this shows that the first protocol processing unit 11 has completed the process for the descriptor, and therefore, the second state transition processing unit 213 acquires the event type and the connection information. If the event type is "ESTABLISHED", the second state transition processing unit 213 performs a process such as the activation of an application waiting for the connection establishment.

Figure 7:
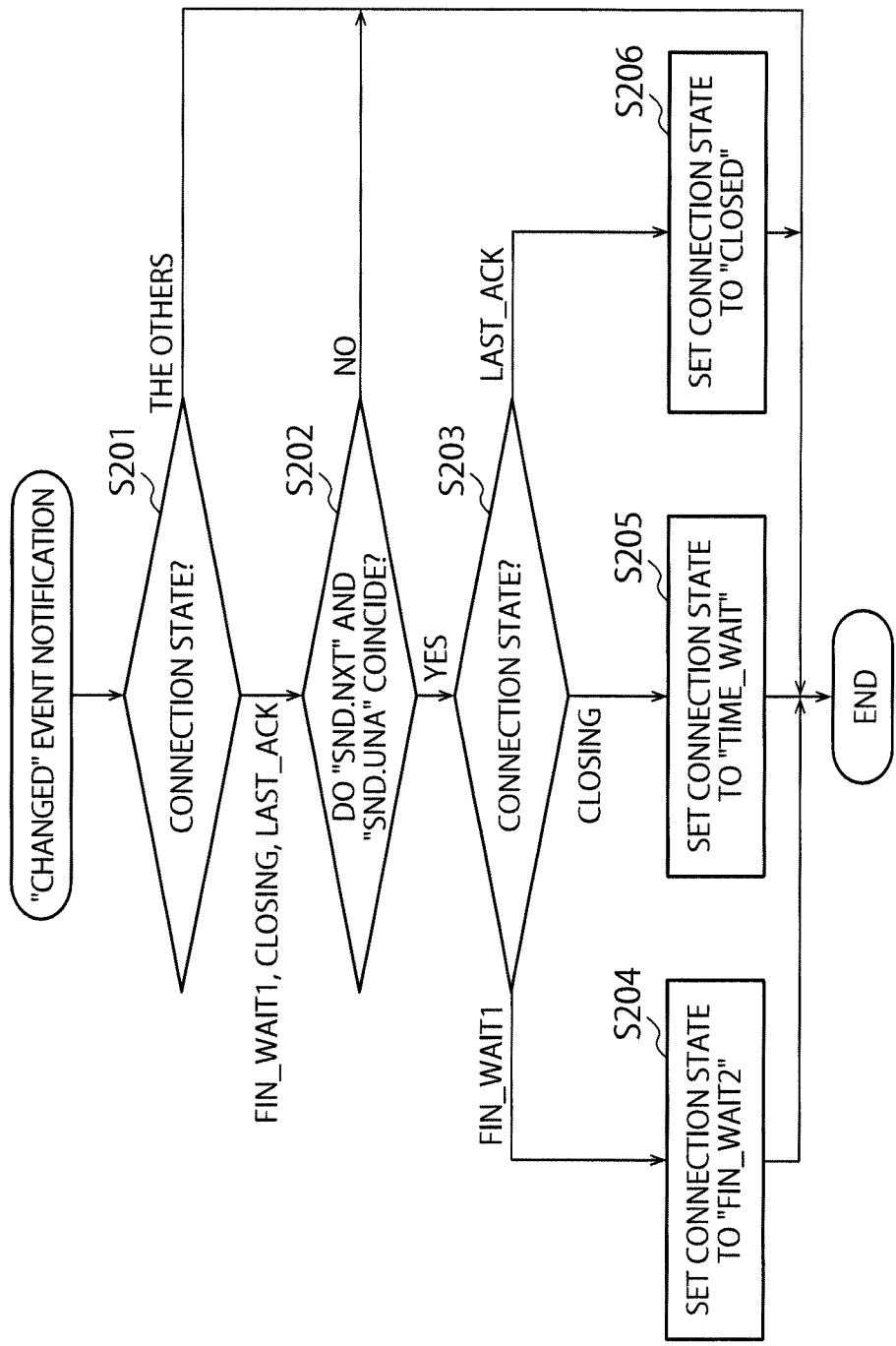
FIG. 7 is a flowchart showing an example of the flow of the process when the event notification is "CHANGED".

Meanwhile, as for the process of the second state transition processing unit 213 when the event notification is "CHANGED", the process of a flowchart shown in FIG. 7 is executed. FIG. 7 is a flowchart showing an example of the flow of the process when the event notification is "CHANGED".

(Step S201) As shown in FIG. 7, the second state transition processing unit 213 judges whether the connection state is any one of "FIN_WAIT1", "CLOSING" and "LAST_ACK". In the case where the connection state is any one of "FIN_WAIT1", "CLOSING" and "LAST_ACK", the process proceeds to step S202. On the other hand, in the case where the connection state is other than them, the second protocol processing unit 21 ends the process.

(Step S202) In the case of judging that the connection state is any one of "FIN_WAIT1", "CLOSING" and "LAST_ACK" in step S201, the second state transition processing unit 213 judges whether "SND.NXT" and "SND.UNA" of the connection information coincide. If "SND.NXT" and "SND.UNA" of the connection information coincide (YES), the second state transition processing unit 213 proceeds to step S203. On the other hand, if "SND.NXT" and "SND.UNA" of the connection information do not coincide (NO), the second state transition processing unit 213 ends the process.

(Step S203) The second state transition processing unit 213 branches the process depending on the connection state. The second protocol processing unit 21 proceeds to step S204 if the connection state is "FIN_WAIT1", proceeds to step S205 if the connection state is "CLOSING", and proceeds to step S206 if the connection state is "LAST_ACK".

(Step S204) If the connection state is "FIN_WAIT1", the second state transition processing unit 213 transits the state to "FIN_WAIT2".

(Step S205) If the connection state is "CLOSING", the second state transition processing unit 213 transits the state to "TIME_WAIT".

(Step S206) If the connection state is "LAST_ACK", the second state transition processing unit 213 transits the state to "CLOSED".

On this occasion, the first protocol processing unit 11 may add, as the accompanying information of the event notification, the information such as whether the occurrence of the event involves the reception of a new data segment, or whether the sequence number is a value less than "RCV.NXT", and may use it for the state transition process in the second state transition processing unit 213. When the process of the frame is completed, the second state transition processing unit 213 sets the DONE bit of the status bits to 0, increments the value of its own managing "tail" by 1, and reflects the value of the "tail" in the value of "tail" of the first protocol processing unit 11. Thereby, the first protocol processing unit 11 can newly perform the writing in the descriptor for which the process is completed. The second state transition processing unit 213 repeats this operation, whenever an interrupt occurs.

The constituent elements included in the second protocol processing unit 21 supports various protocols such as ARP, IPv6, ICMP and UDP (User Datagram Protocol), in addition to Ethernet®, IPv4 and TCP. In TCP, the first protocol processing unit 11 cannot process the FIN segment, the RST segment and the like, but the second protocol processing unit 21 can process all the segments. The second state transition processing unit 213 also can perform all the state transitions except the transition to "ESTABLISHED", which is performed by the first state transition processing unit 113.

The establishment of the connection in TCP is classified into an active open in which the connection establishment is performed from its own apparatus, a passive open in which the connection establishment is performed from the partner apparatus, and a simultaneous open in which both hosts simultaneously perform the connection establishment.

Figure 8:
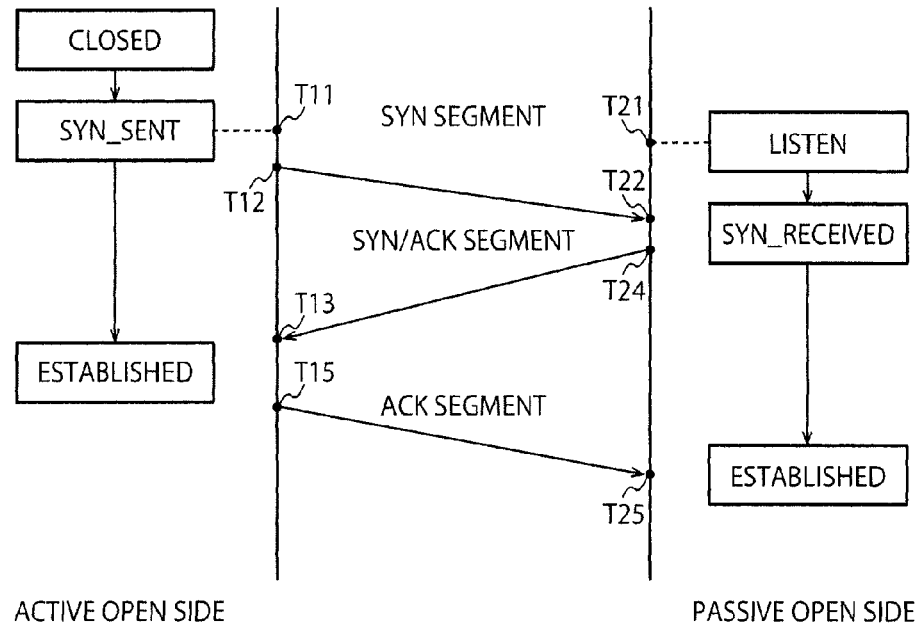
FIG. 8 is a sequence diagram showing the flow of the processes of a passive open and an active open.

The passive open and the active open will be explained using FIG. 8. FIG. 8 is a sequence diagram showing the flow of the processes of a passive open and an active open. Here, in FIG. 8, the sequence number, the acknowledgement number and the like contained in each TCP segment are omitted. It is assumed that the SYN flag is counted as 1 byte and the acknowledgement number is transmitted, similarly to the regulation of RFC793.

(The Flow of the Process of the Passive Open)

First, the passive open will be explained.

(T21) Its own apparatus, first, creates the connection information in which the connection state is "LISTEN", for waiting for the connection establishment request from a partner apparatus.

(T11) The partner apparatus creates the connection information for performing the communication, and shifts the connection state to "SYN_SENT".

(T12) Then, the partner apparatus transmits the SYN segment.

(T22) Its own apparatus receives this SYN segment, and newly creates the connection information in which the connection state is "SYN_RECEIVED".

(T24) Then, its own apparatus transmits the created SYN/ACK segment to the partner apparatus.

(T13) The partner apparatus receives this segment, and shifts the connection state to "ESTABLISHED".

(T15) The partner apparatus transmits the ACK segment toward its own apparatus.

(T25) Its own apparatus receives this ACK segment, and transits the connection state to "ESTABLISHED" so that the connection between both is established.

(The Detail of the Process of the Passive Open)

In the following, first, the detail of the flow of the process of the passive open in the connection establishment according to the embodiment will be explained. First, by the request from an application or the like, for waiting for the connection establishment request, the second protocol processing unit 21 creates the connection information in which the connection state is "LISTEN". This connection information does not necessarily have to be saved in the connection information storing unit 12, and may be saved in the memory 3 of the information processor 100.

The partner apparatus transmits the SYN segment, which is the connection establishment request. The SYN segment reaches the first protocol processing unit 11 through the network 200, and here, the process for the protocol of each layer is performed. The first header analyzing unit 111 detects that this segment is a segment in which only the SYN flag is set to 1, performs the allocation of the identifier of the connection information and the initialization, and creates the connection information in which the connection state is "SYN_RECEIVED".

Then, the first header analyzing unit 111 transfers the control frame and the accompanying information that contains the start address of the allocated and initialized connection information, to the second header analyzing unit 211 of the second protocol processing unit 21. Once receiving this, the second protocol processing unit 21, first, performs the analysis of the protocol of each layer, by the second header analyzing unit 211.

On this occasion, the processing result by the first header analyzing unit 111 may be transferred as the accompanying information of the control frame, and the process may be omitted in the second header analyzing unit 211. When the second header analyzing unit 211 detects that this is the SYN segment, the second connection information searching unit 212 searches the connection state of "LISTEN". For a quick search, it is preferable that the connection information be divided into "LISTEN", "TIME_WAIT" and the other states and be managed by hash tables.

Concretely, the second connection information searching unit 212 uses the destination IP address, source IP address, destination TCP port number and source TCP port number of the SYN segment, and searches the connection information in which they match and the connection state is "LISTEN". In the case where the matching connection information of "LISTEN" is found, the second state transition processing unit 213 links the connection information transferred as the accompanying information of the frame, to a hash table. Then, the second state transition processing unit 213 transits the connection state from "LISTEN" to "SYN_RECEIVED". Thereby, the first header generating unit 116 transits the SYN/ACK segment to the partner apparatus through the network 200.

Then, the second header generating unit 214 generates the SYN/ACK segment for the response, and instructs the first header generating unit 116 of the first protocol processing unit 11 to transmit it as the control frame. Here, in the case where the connection information in which the connection state is "LISTEN" is not found, or in the case of being a SYN segment that is unacceptable for a packet filter or the like, the first protocol processing unit 11 is instructed to free the connection information transferred as the accompanying information of the frame.

Next, once the SYN/ACK segment reaches the partner apparatus, the ACK segment is transmitted as the response. Once this is received by the first protocol processing unit 11, the first header analyzing unit 111, first, performs the protocol process of each layer, and thereafter, the first connection information searching unit 112 searches the connection information corresponding to the ACK segment. Thereby, the connection of "SYN_RECEIVED" that was previously linked to the hash table is found.

The first state transition processing unit 113 performs the judgment using this connection information and the information on the ACK segment, and if the condition is met, performs the update of the connection information and the transition of the connection state to "ESTABLISHED". Then, the first state transition processing unit 113 adds the start address of the connection information to the accompanying information of the event, and performs the "ESTABLISHED" event notification to the second protocol processing unit 21. The second protocol processing unit 21 receives this, and informs the application or the like that the state has been changed to "ESTABLISHED". By the above, the passive open is actualized.

Thus, on the passive open side, when the connection establishment request is received from the second partner apparatus, the first header generating unit (transmission processing unit) 116 transmits the connection acceptance response (SYN_ACK segment), which is a response of acceptance of the connection establishment request, to the second partner apparatus. Then, when the acceptance response (ACK segment) from the partner apparatus to the connection acceptance response (SYN_ACK segment) is detected as the result of the analysis by the analyzing unit, the first connection information searching unit 112 searches the connection information corresponding to the acceptance response, from the connection information storing unit 12, in which the connection information is saved, based on the result of the analysis by the analyzing unit.

When the acceptance response from the partner apparatus to the connection acceptance response is detected as the result of the analysis by the first header analyzing unit (analyzing unit) 111, the first state transition processing unit 113 transits the connection state from the connection request reception state (SYN_RECEIVED), in which the connection establishment request has been received, to the connection establishment state (ESTABLISHED). Concretely, the first state transition processing unit 113 transits the connection state contained in the connection information that is searched and obtained by the first connection information searching unit 112, from the connection request reception state (SYN_RECEIVED) to the connection establishment state (ESTABLISHED).

(The Flow of the Process of the Active Open)

Next, in the active open, the operation is the same as the previously-described partner apparatus. A partner apparatus creates the connection information in which the connection state is "LISTEN", and waits for the connection establishment request. At this time, its own apparatus creates the connection. Then, its own apparatus shifts the connection state to "SYN_SENT", and transmits the SYN segment. Then, its own apparatus receives the SYN/ACK, transits the connection state to the "ESTABLISHED" state, and transmits the ACK segment, so that the connection between both is established.

(The Detail of the Process of the Active Open)

Next, the detail of the flow of the process of the active open according to the embodiment will be explained. In the active open, first, the second header generating unit 214 of the second protocol processing unit 21 generates the SYN segment for performing the connection establishment. After the generation of the SYN segment, the second header generating unit 214 writes the address and length of the generated segment, in a descriptor of the transmission frame descriptor ring, as the reading address of the frame and the length of the frame.

On this occasion, the accompanying information of the frame contains the writing address and length of the reception data and the reading address and length of the transmission data, which are the information not contained in the SYN segment, as values to be initially set when the connection information is allocated later. Here, the writing address is the start address of the writing destination, for example, and the reading address is the start address of the reading source, for example.

Furthermore, for linking the connection information to the list of a hash table, the second header generating unit 214 instructs the second connection information searching unit 212 to acquire the addresses and values (connection-information linking information) of the previous connection information and next connection information to a position where the connection information to be allocated is inserted, and writes them in the descriptor. For example, the start address of the next connection information to the position where the connection information to be allocated is inserted, the address of the "pointer to the previous connection information (PREV)" of the next connection information to the position where the connection information to be allocated is inserted, and the address of the "pointer to the next connection information (NEXT)" of the previous connection information to the position where the connection information to be allocated is inserted are written.

On this occasion, if the connection information to be allocated is positioned at the tail end of the list, a special value that shows non-existence, such as "NULL", is written as the start address of the next connection information to the position where the connection information to be allocated is inserted. Further, if the connection information to be allocated is positioned at the head of the list, the address of the corresponding element of the root array is written as the address of the "pointer of the next connection information (NEXT)" of the previous connection information to the position where the connection information to be allocated is written. On this occasion, the second header generating unit 214 may explicitly show, as the accompanying information of the frame, that this frame is the connection establishment request, and from this information, the first header generating unit 116 may make the judgment of being the connection establishment request.

The second header generating unit 214 instructs the first header generating unit 116 of the first protocol processing unit 11 to transmit the transmission frame descriptor. Once receiving this instruction, the first header generating unit 116 reads the frame, detects that it is the SYN segment in TCP, by the analysis of the header, and then, makes the judgment of being the connection establishment request. Once this judgment is made, the first header generating unit 116 allocates the connection information, and writes the information such as the IP address of its own apparatus, the IP address of the partner apparatus, the TCP port number of its own apparatus, the TCP port number of the partner apparatus, the transmission sequence number and its own window size, from the information contained in the SYN segment to the allocated connection information. On this occasion, as for the connection state also, the SYN segment is transmitted, and therefore, the first header generating unit 116 sets the connection state to "SYN_SENT". Here, the first protocol processing unit 11 may write the information such as the destination MAC address, TTL value and TOS value that are contained in the SYN segment. Further, the first header generating unit 116 acquires the writing address and length of the reception data, and the reading address and length of the transmission data, from the accompanying information of the descriptor, and writes the acquired information in the connection information.

Furthermore, when the initialization of the connection information is completed, the first protocol processing unit 11 performs the linking process to the list of the hash table, using the connection-information linking information acquired from the descriptor. First, the first protocol processing unit 11 writes the start address of the next connection information to the position where the connection information is inserted, in the "pointer to the next connection information" of the allocated connection information. Next, if being not a value such as "NULL" showing the non-existence of the next connection information to the position where the allocated connection information is inserted, the first protocol processing unit 11 writes the start address of the allocated connection information, in the "pointer to the previous connection information (PREV)" of the next connection information to the position where the allocated connection information is inserted. Next, the first protocol processing unit 11 writes the start address of the allocated connection information, in the "pointer to the next connection information (NEXT)" of the previous connection information to the position where the allocated connection information is inserted.

When the allocation and initialization of the connection information and the linking to the hash table are completed, the first header generating unit 116 transmits the SYN segment to the partner apparatus through the network 200. Here, for facilitating the linking to the hash table, the second protocol processing unit 21 may calculate the hash value of the SYN segment in advance, and may calculate the entry address of the termination of the hash table.

Once receiving the SYN/ACK segment as the response from the partner apparatus, the first header analyzing unit 111 performs the protocol process of each layer of the received SYN/ACK segment. Thereafter, the first connection information searching unit 112 searches the connection information, and finds the connection information to which the allocation and the initialization were previously performed and in which the connection state is "SYN_SENT". For this, the first connection information searching unit 112 checks the sequence number, the acknowledgement number and the like. If the condition of the connection establishment is met, the first state transition processing unit 113 transits the connection state from "SYN_SENT" to "ESTABLISHED". Then, the first header generating unit 116 transmits the ACK segment to the partner apparatus. Then, the first state transition processing unit 113 adds the start address of the connection information to the accompanying information of the event, and issues the "ESTABLISHED" event notification, to the second state transition processing unit 213 of the second protocol processing unit 21.

The second state transition processing unit 213 receives this event notification, and, if there is an application or the like that waits for the event notification of the "ESTABLISHED" state, performs the notification to it. Then, the segment of the acknowledgement is processed in the partner apparatus, and the connection is established between both. Thereby, it is possible to perform the transmission and reception of data.

Thus, when the reception frame is the connection establishment request, the first state transition processing unit 113 allocates the identifier of the connection information from the connection information storing unit 12. The second protocol processing unit 21 transits the connection state to the connection establishment request reception state (SYN_RECEIVED), using the connection information that is indicated by the identifier allocated by the first state transition processing unit 113.

As described above, on the active open side, the first header generating unit (transmission processing unit) 116 receives the request from the external CPU 2, and transmits the connection establishment request on the predetermined protocol, to the partner apparatus through the network 200.

When the connection acceptance response from the partner apparatus to the connection establishment request is detected as the result of the analysis by the first header analyzing unit (analyzing unit) 111, the first connection information searching unit 112 searches the connection information corresponding to the connection acceptance response, from the connection information storing unit 12 in which the connection information is saved, based on the result of the analysis by the first header analyzing unit (analyzing unit) 111. When the connection acceptance response from the partner apparatus to the connection establishment request is detected as the result of the analysis by the first header analyzing unit (analyzing unit) 111, the first state transition processing unit 113 transits the connection state contained in the connection information, from the wait state (SYN_SENT) of waiting for the response, to the connection establishment state (ESTABLISHED). Concretely, the first state transition processing unit 113 transits the connection state contained in the connection information that is searched and obtained by the first connection information searching unit 112, from the wait state (SYN_SENT) of waiting for the response, to the connection establishment state (ESTABLISHED).

(The Flow of the Process of the Simultaneous Open)

Figure 9:
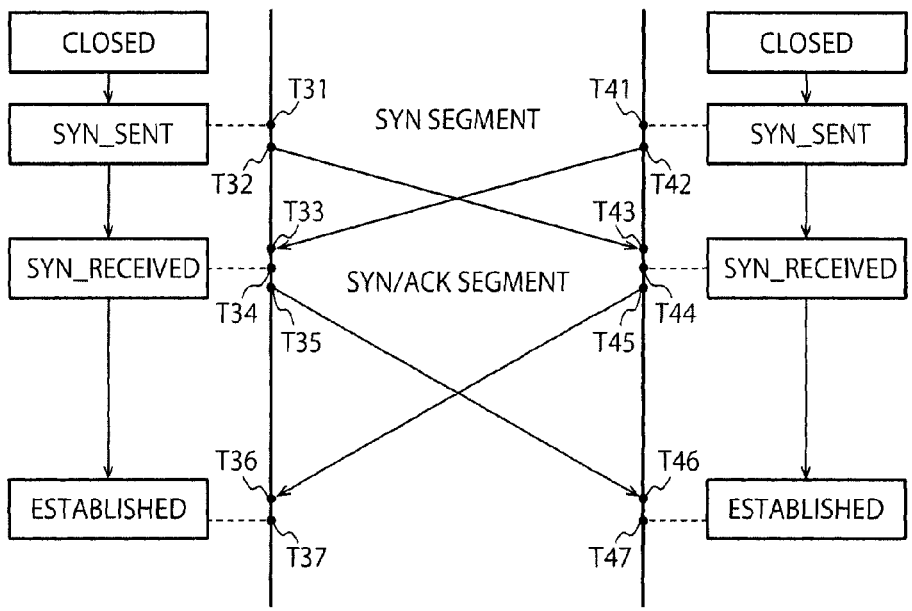
FIG. 9 is a sequence diagram showing the flow of the process of a simultaneous open according to the embodiment.

Next, the simultaneous open will be explained using FIG. 9. FIG. 9 is a sequence diagram showing the flow of the process of a simultaneous open according to the embodiment. The simultaneous open occurs when its own apparatus and the partner apparatus simultaneously transmit the connection establishment request.

(T31, T41) First, its own apparatus creates the connection, and performs the transition to "SYN_SENT".

(T32, T42) Then, its own apparatus transmits a SYN segment.

(T33, T43) After the transmission of the SYN segment, its own apparatus receives a SYN segment from the partner apparatus also.

(T34, T44) Once the SYN segment is received from the partner apparatus, the connection state is transited from "SYN_SENT" to "SYN_RECEIVED".

(T35, T45) Then, a SYN/ACK is transmitted.

(T36, T46) The partner also transmits a SYN/ACK similarly, and therefore, its own apparatus receives this.

(T37, T47) Once receiving the SYN/ACK, its own apparatus transits the connection state to "ESTABLISHED", so that the connection is established.

(The Detail of the Process of the Simultaneous Open)

Next, the detail of the flow of the process of the simultaneous open according to the embodiment will be explained. The simultaneous open has the same sequence as the active open partway. The generation and transmission of the SYN segment by the second header generating unit 214 of the second protocol processing unit 21 are performed in the same procedure as the active open. Then, the processes vary after the reception of the SYN segment as the response. When the SYN segment is detected from the reception frame, the first header analyzing unit 111 performs the protocol process of each layer, and makes the judgment of being the connection establishment request. The first header analyzing unit 111 requests the connection information allocation to the first connection information searching unit 112, and initializes the connection information. Thereafter, the first state transition processing unit 113 passes the received SYN segment, together with the connection information, to the second state transition processing unit 213 of the second protocol processing unit 21.

The second connection information searching unit 212 of the second protocol processing unit 21 searches the connection information, and detects the simultaneous open. Then, since two pieces of connection information: the connection information in which the connection state is "SYN_SENT" and the connection information in which the connection state is "SYN_RECEIVED" have been created, the second connection information searching unit 212 performs a freeing request for deleting the connection information in which the connection state is "SYN_SENT", to the first state transition processing unit 113 of the first protocol processing unit 11. Then, the first state transition processing unit 113 frees the connection in which the connection state is "SYN_SENT". On this occasion, the first state transition processing unit 113 may free not the connection in which the connection state is "SYN_SENT" but the connection information in which the connection state is "SYN_RECEIVED", and may transit the connection information in which the connection state is "SYN_SENT", to "SYN_RECEIVED".

The second header generating unit 214 of the second protocol processing unit 21 generates a SYN/ACK segment for the connection in which the connection state is "SYN_RECEIVED", and instructs the first header generating unit 116 of the first protocol processing unit 11 to transmit it. Since a SYN/ACK segment is similarly transmitted from the partner, the first header analyzing unit 111 of the first protocol processing unit 11 performs the protocol process of each layer, and thereafter, the first connection information searching unit 112 searches the connection information. As the result of the connection search, the first connection information searching unit 112 finds the connection information in which the connection state is "SYN_RECEIVED". As the result of the connection establishment judgment, the first state transition processing unit 113 sets the connection state to "ESTABLISHED". Thereby, after this, it is possible to perform the transmission and reception of data. Thereafter, the first state transition processing unit 113 performs the "ESTABLISHED" event notification, to the second state transition processing unit 213 of the second protocol processing unit 21.

Thus, in the simultaneous open, the first header generating unit (transmission processing unit) 116 receives the request from the external CPU 2, and transmits the connection establishment request on the predetermined protocol, to the partner apparatus through the network 200. Then, the first header analyzing unit (analyzing unit) 111 analyzes the first reception frame that is received after the transmission of the connection establishment request.

When the connection establishment request on the determined protocol from the partner apparatus is detected as the result of the analysis of the first reception frame by the first header analyzing unit (analyzing unit) 111, the first header generating unit (transmission processing unit) 116 transmits the connection acceptance response (SYN/ACK segment), which is a response of acceptance of the connection establishment request, to the partner apparatus through the network 200.

The first header analyzing unit (analyzing unit) 111 analyzes the second reception frame that is received after the transmission of the connection acceptance response. Then, when the connection acceptance response (SYN/ACK segment) from the partner apparatus to the connection establishment request is detected as the result of the analysis of the second reception frame by the first header analyzing unit (analyzing unit) 111, the first connection information searching unit 112 searches the connection information corresponding to the connection acceptance response (SYN/ACK segment), from the connection information storing unit 12, in which the connection information is saved, based on the result of the analysis by the first header analyzing unit (analyzing unit) 111.

When the connection acceptance response (SYN/ACK segment) from the partner apparatus to the connection establishment request is detected as the result of the analysis of the second reception frame by the first header analyzing unit (analyzing unit) 111, the first state transition processing unit 113 transits the connection state contained in the connection information, from the wait state (SYN_RECEIVED) of waiting for the response, to the connection establishment state (ESTABLISHED). Concretely, the first state transition processing unit 113 transits the connection state contained in the connection information that is searched and obtained by the first connection information searching unit 112, from the wait state (SYN_RECEIVED) of waiting for the response, to the connection establishment state (ESTABLISHED).

Here, the above description shows only the normal sequence for the connection establishment. For example, in the case where the RST segment or the FIN segment arrives when the connection state is "SYN_SENT" or "SYN_RECEIVED", the first header analyzing unit 111 of the first protocol processing unit 11 makes the judgment of being the control frame. Then, the first header analyzing unit 111 of the first protocol processing unit 11 transfers this frame information to the second header analyzing unit 211 of the second protocol processing unit 21. Thereafter, the second protocol processing unit 21 performs the header analysis, the connection search, the update of the connection information, and the connection state transition process.

Meanwhile, as the break of the connection, there are a break by the FIN segment in which the FIN flag of the control flags in TCP is set to 1, and a break by the RST segment in which the RST flag of the control flags in TCP is set to 1. As the break by the transmission of the FIN segment, there are an active close in which the FIN segment is transmitted from its own apparatus, a passive close in which the FIN segment from the partner is received, and a simultaneous close in which the FIN segments are simultaneously transmitted.

Figure 10:
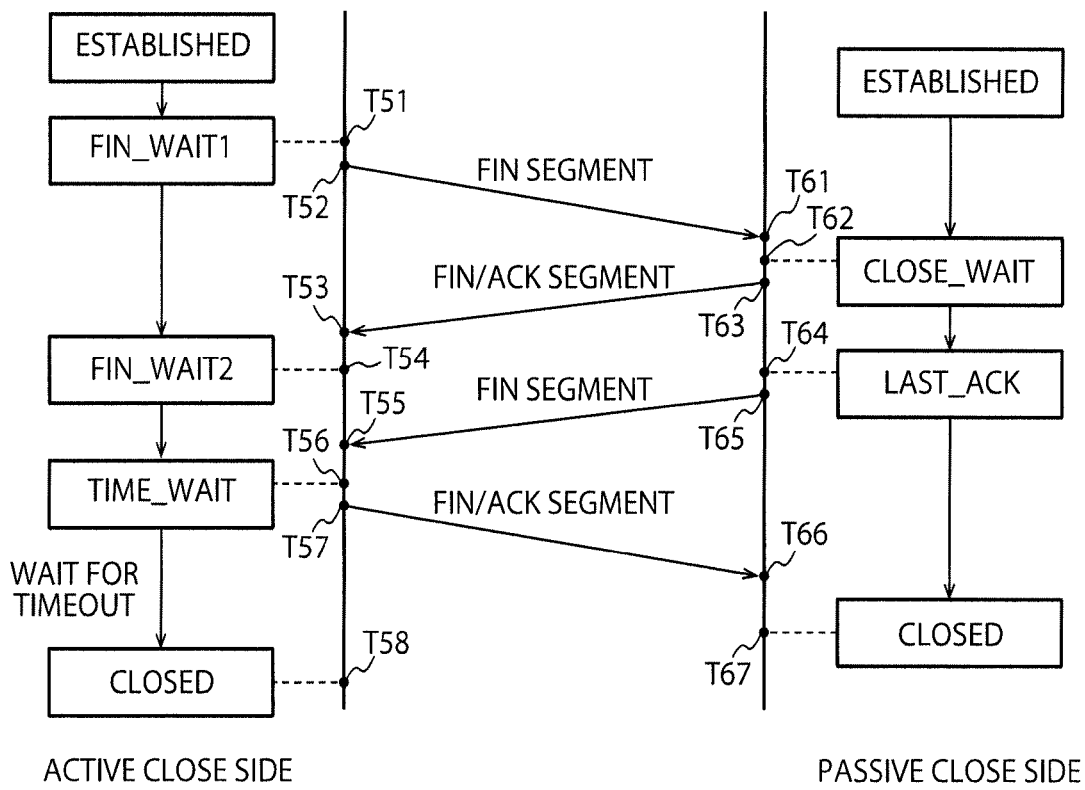
FIG. 10 is a sequence diagram showing the flow of an active close and a passive close.

Next, the flow of the active close and passive close will be explained using FIG. 10. FIG. 10 is a sequence diagram showing the flow of an active close and a passive close.

First, the case of the active close will be explained.

(T51) Once an application or the like performs the instruction of the break of the connection, the second protocol processing unit 21 updates the connection information, and transits the connection state from "ESTABLISHED" to "FIN_WAIT1".

(T52) The second protocol processing unit 21 generates the FIN segment, and instructs the first protocol processing unit 11 to transmit it as the control frame. Once receiving this FIN segment, the partner apparatus transmits the FIN/ACK segment, which is a segment of the acknowledgement to the FIN segment (T63).

(T53) The first protocol processing unit 11 receives this FIN/ACK segment.

(T54) The first protocol processing unit 11 performs the header analysis, and thereafter, performs the connection search. When it is found that the connection state is "FIN_WAIT1", the first protocol processing unit 11 updates the "SND.UNA" and others of the connection information, so that the reception process of the frame is completed. Then, the first protocol processing unit 11 transfers the connection information to the second protocol processing unit 21, by the "CHANGED" event notification. After confirming that the connection state is "FIN_WAIT1", the second state transition processing unit 213 acquires the values of "SND.UNA" and "SND.NXT" from the connection information, and if they coincide, transits the connection state from "FIN_WAIT1" to "FIN_WAIT2". When the data transmission is completed, the partner apparatus transmits the FIN segment (T65).

(T55) The first protocol processing unit 11 receives this FIN segment.

(T56) As the result of the header analysis, the FIN flag of the control flags in TCP is set to 1, and therefore, the first header analyzing unit 111 of the first protocol processing unit 11 transfers the reception frame to the second protocol processing unit 21, as the control frame. Then, in the second protocol processing unit 21, the second header analyzing unit 211 performs the header analysis process. Thereafter, the second connection information searching unit 212 searches the connection information, based on the result of the analysis by the second header analyzing unit 211. When it is found that the connection state is "FIN_WAIT2", the second state transition processing unit 213 transits the connection state from "FIN_WAIT2" to "TIME_WAIT".

(T57) Next, the second header generating unit 214 generates the FIN/ACK segment, and instructs the first protocol processing unit 11 to transmit the FIN/ACK segment.

(T58) The connection state transited to "TIME_WAIT", by a timer process in the CPU 2, is transited to "CLOSED", after a certain time. Thus, the active close is actualized.

Next, the passive close will be explained using FIG. 10.

(T61) The first protocol processing unit 11 receives the FIN segment transmitted from the partner apparatus, when the connection state is "ESTABLISHED".

(T62) As the result of the header analysis, the FIN flag is set to 1, and therefore, the first header analyzing unit 111 of the first protocol processing unit 11 transfers the reception frame to the second protocol processing unit 21, as the control frame. The second header analyzing unit 211 of the second protocol processing unit 21 performs the header analysis, and the second connection information searching unit 212 searches the connection information.

When the connection information in which the connection state is "ESTABLISHED" is obtained, as the result of the search, the second state transition processing unit 213 updates the connection information, and thereafter, transits the connection state from "ESTABLISHED" to "CLOSE_WAIT".

(T63) The second header generating unit 214 generates the FIN/ACK segment, and instructs the first protocol processing unit 11 to transmit the control frame corresponding to the FIN/ACK segment.

(T64) When the data transmission from its own apparatus is finished, the connection break is requested from the application or the like to the second protocol processing unit 21. Once receiving this, the second state transition processing unit 213 of the second protocol processing unit 21 updates the connection information, and thereafter, transits the connection state from "CLOSE_WAIT" to "LAST_ACK".

(T65) The second header generating unit 214 generates the FIN segment, and instructs the first protocol processing unit 11 to transmit the frame corresponding to the FIN segment. Once receiving this FIN segment, the partner apparatus transmits the FIN/ACK segment corresponding to this.

(T66) Next, the first protocol processing unit 11 receives the FIN/ACK segment transmitted by the partner apparatus. Then, the first protocol processing unit 11, after the header analysis, searches the connection information, detects that the connection state is "LAST_ACK", updates the connection information, and completes the reception process of the frame. Then, the first protocol processing unit 11 performs the "CHANGED" event notification to the second protocol processing unit 21, together with the connection information.

(T67) The second state transition processing unit 213 of the second protocol processing unit 21 transits the connection state from "LAST_ACK" to "CLOSED", by the values of "SND.UNA" and "SND.NXT". Thereby, the passive close is actualized.

Thus, after the connection establishment, the first header analyzing unit (analyzing unit) sorts the reception frame into the control frame and the data frame, and outputs the control frame to the CPU 2, which performs the process for the predetermined protocol to this control frame. Concretely, when the reception frame is the connection break request as the result of the analysis of the reception frame, the first header analyzing unit (analyzing unit) 111 sorts the reception frame of the connection break request into the control frame, and outputs this control frame to the second protocol processing unit 21 of the CPU 2. Then, the second protocol processing unit 21 executes the transition of the connection state, based on the control frame output from the first protocol processing unit 11. Here, the connection break request is the FIN segment in which the bit for the FIN flag in TCP is set to 1, or the RST segment in which the bit for the RST flag in TCP is set to 1.

Figure 11:
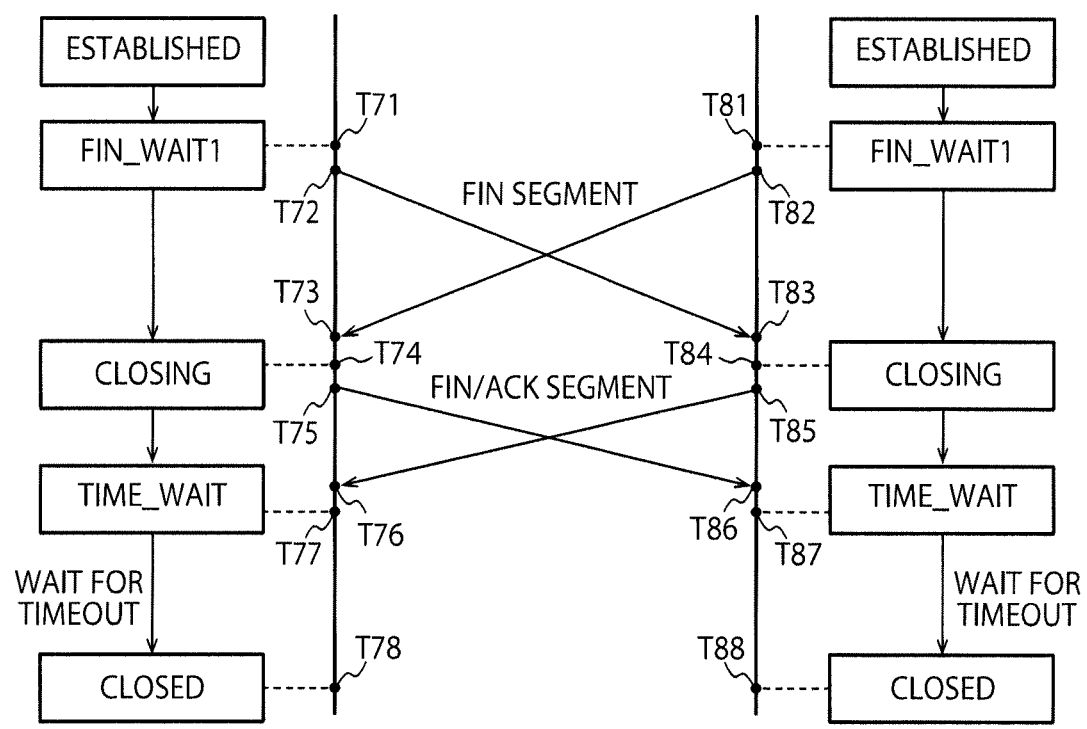
FIG. 11 is a sequence diagram showing the flow of the process of a simultaneous close according to the embodiment.

Next, the simultaneous close will be explained using FIG. 11. FIG. 11 is a sequence diagram showing the flow of the process of a simultaneous close according to the embodiment.

The simultaneous close is similar to the active close in that a FIN segment is transmitted from its own apparatus, but is different from the flow of the active close in that a FIN segment is received next.

(T71, T81) Once an application or the like performs the instruction of the break of the connection, the second protocol processing unit 21 updates the connection information, and transits the connection state from "ESTABLISHED" to "FIN_WAIT1".

(T72, T82) The second protocol processing unit 21 generates a FIN segment, and instructs the first protocol processing unit 11 to transmit it as the control frame.

(T73, T83) Once receiving a FIN segment, the first protocol processing unit 11 performs the header analysis, and transfers the reception frame to the second protocol processing unit 21, as the control frame. Thereby, the subsequent process is performed in the second protocol processing unit 21.

(T74, T84) The second header analyzing unit 211 of the second protocol processing unit 21 performs the header analysis process. Thereafter, the second connection information searching unit 212 performs the connection search. When it is found that the connection state is "FIN_WAIT1", the second state transition processing unit 213 transits the connection state from "FIN_WAIT1" to "CLOSING".

(T75, T85) The second header analyzing unit 211 generates a FIN/ACK segment, and instructs the first protocol processing unit 11 to transmit the control frame corresponding to the FIN/ACK segment. Thereafter, the partner apparatus also transmits a FIN/ACK segment, similarly.

(T76, T86) The first protocol processing unit 11 receives this FIN/ACK segment.

(T77, T87) After the header analysis, the first protocol processing unit 11 performs the connection search. When it is found that the connection state is "CLOSING", the first protocol processing unit 11 updates the connection state, and completes the reception process. Then, the first protocol processing unit 11 performs the "CHANGED" event notification to the second protocol processing unit 21, together with the connection information. Once receiving this, the second protocol processing unit 21 detects that the connection state is "CLOSING", and performs the transition to "CLOSED", using the values of "SND.UNA" and "SND.NXT".

(T78, T88) The connection state transited to "TIME_WAIT", by a timer process in the CPU 2, is transited to "CLOSED", after a certain time. Thereby, the simultaneous close is actualized.

Figure 12:
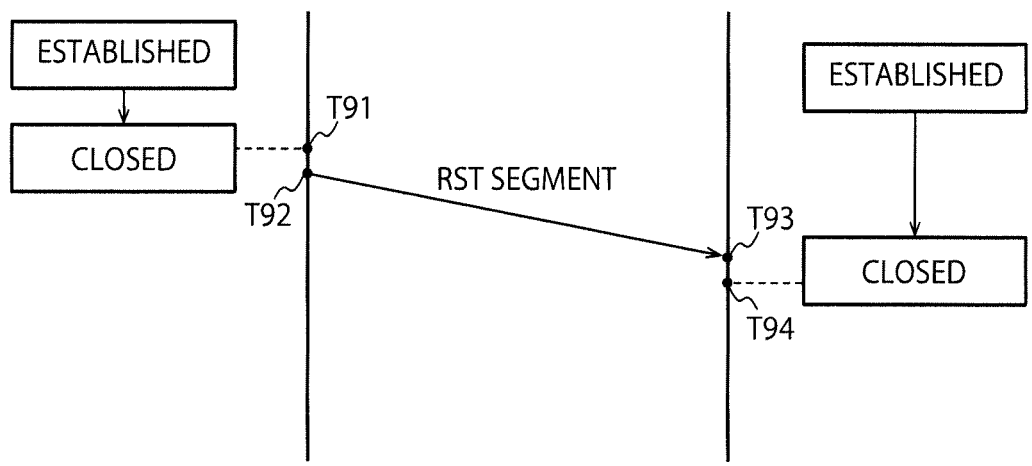
FIG. 12 is a sequence diagram showing the flow of a connection break process according to the embodiment.

Next, the break of the connection by the RST segment will be explained using FIG. 12. FIG. 12 is a sequence diagram showing the flow of a connection break process according to the embodiment.

(T91) The second protocol processing unit 21 transits the connection state from the "ESTABLISHED" state to "CLOSED".

(T92) Next, the first header generating unit 116 transmits the RST segment to the partner apparatus.

(T93) The first protocol processing unit 11 of the partner apparatus receives the RST segment.

(T94) Next, the first protocol processing unit 11 of the partner apparatus transmits this to the second protocol processing unit 21, as the control frame. The second protocol processing unit 21 performs the header analysis and the connection search. If the RST segment is acceptable, the second state transition processing unit 213 transits the connection state from "ESTABLISHED" to "CLOSED". Thereby, the break of the connection is actualized.

Thus, the first protocol processing unit 11 transfers the FIN segment and the RST segment to the second protocol processing unit 21, as the control frame. Furthermore, when the connection state is "FIN_WAIT1", "CLOSING" or "LAST_ACK", the first protocol processing unit 11 performs the "CHANGED" event notification to the second protocol processing unit 21. Thereby, it is possible to execute the state transition associated with the connection break, in the second protocol processing unit 21.

Here, in the above, the example in which the event notification is performed from the first protocol processing unit 11 to the second protocol processing unit 21 has been shown, but it can be omitted particularly when the detection of the state transition in the second protocol processing unit 21 is unnecessary. Further, the second protocol processing unit 21 may actively detect the events by polling or the like.

Thus, in the embodiment, at the time of the connection establishment, the first protocol processing unit 11 according to the embodiment performs the connection establishment judgment and the state transition of the connection information, using the reception frame and the connection information. Instead of the CPU 2, the first protocol processing unit 11, in which the FPGA or the like is implemented, performs the state transition for the connection establishment, and thereby, in the information processor 100 that establishes many connections, it is possible to reduce the load on the CPU 2 of the information processor 100.

Further, the first protocol processing unit 11 is implemented in hardware, and thereby, the first protocol processing unit 11 can quickly perform the connection establishment judgment. Thereby, it is possible to shorten the time necessary for the connection establishment.

Further, the first protocol processing unit 11 does not need to transfer the frame involved in the connection establishment, to the CPU 2, and thereby, it is possible to reduce the utilization rate of the bandwidth of the bus between the CPU 2 and the first protocol processing unit 11. Further, when all the complex connection transitions in TCP are implemented in the first protocol processing unit 11 side, the circuit scale increases, leading to an increase in the power consumption and an increase in the mounting area. Therefore, only the state transition involved in the connection establishment is performed in the first protocol processing unit 11 side, and the other state transitions are performed in the CPU 2 of the information processor 100. Thereby, it is possible to suppress the increase in the circuit scale of the first protocol processing unit 11, and therewith, to actualize a quick connection establishment.

(Modifications)

Here, in the above-described embodiment, the example in which the connection information is searched using the hash table has been shown. However, it is allowable to provide a bit indicating whether to be used or unused, in the connection information itself, and to search all the connection information while checking this bit, or it is allowable to perform the search using a bit map area for previously managing whether to be used or unused.

Further, the above-described embodiment adopts TCP as an example. However, another protocol for performing the data communication after the connection establishment, such as SCTP (Stream Control Transmission Protocol), can be also used. The first protocol processing unit 11 may be actualized by hardware such as an ASIC, or may be actualized by a network processor, a DSP (Digital Signal Processor), a GPU (Graphics Processing Unit), another general-purpose processor or the like.

Further, as for the first state transition processing unit 113 and the second state transition processing unit 213, it is allowable that a function included in one connection state transition processing unit is not included in the other state transition processing unit, and the functions are complementarily actualized.

Further, the above example has shown an example in which the state transitions to "FIN_WAIT1", "CLOSING" and "LAST_ACK" are judged by the second protocol processing unit 21, but these processes may be performed by the first protocol processing unit 11. In this case, the second state transition processing unit 213 performs only the state transition processes by the FIN segment and the RST segment, and the first protocol processing unit 11 performs the other connection state transition processes.

Further, the above-described embodiment has shown an example in which the connection information storing unit 12 is included in the communication unit 1, but the connection information storing unit 12 may be included in the memory 3. In this case, it is possible to lower the load on the CPU, although there is no effect of the reduction in the utilization rate of the bus bandwidth.

Here, the communication unit 1 can be actualized, for example, when a processor built in a computer apparatus (for example, a PCI Express card) executes a program. On this occasion, it is allowable to actualize the communication unit 1 by previously installing the above program in the computer apparatus. Further, it is allowable to actualize it by storing the above program in a storage medium such as a CD-ROM or distributing it through a network, and then appropriately installing this program in the computer apparatus. Further, the communication unit 1 can be actualized by appropriately utilizing a storage medium or the like such as a memory, hard disk, CD-R, CD-RW, DVD-RAM or DVD-R that is embedded in or externally attached to the above computer apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication apparatus comprising:
   circuitry configured to:
      control transmitting a connection establishment request on a predetermined protocol or a connection acceptance response, to a partner apparatus through a network, the connection acceptance response being a response of acceptance of a connection establishment request on the predetermined protocol;

analyze a reception frame received from the network; and control transitioning a connection state to a connection establishment state, when, after the transmission of the connection establishment request, a connection acceptance response from the partner apparatus is detected, or when, after the transmission of the connection acceptance response, an acceptance response from the partner apparatus to the connection acceptance response or the connection acceptance response from the partner apparatus is detected, as a result of the analysis, the connection state being contained in connection information that is shared with an external CPU and is used in order to perform a process for the predetermined protocol, the connection establishment state showing that a connection on the predetermined protocol has been established, wherein the circuitry is configured to determine whether to transition the connection state contained in the connection information based on comparison of an acknowledgement number contained in the reception frame and a sequence number contained in the connection information, and the sequence number contained in the connection information is at least one of a sequence number that is used at a time of a next transmission and a sequence number for which an acknowledgement is not yet performed.

2. The communication apparatus according to claim 1, wherein the circuitry is configured to:

control receiving a request from the external CPU, and transmitting the connection establishment request on the predetermined protocol to the partner apparatus through the network, and control transitioning the connection state contained in the connection information, from a wait state to the connection establishment state, when the connection acceptance response from the partner apparatus to the connection establishment request is detected as a result of the analysis, the wait state being a state of waiting for the response.

3. The communication apparatus according to claim 2, wherein the circuitry is further configured to:

search connection information corresponding to the connection acceptance response, from a memory in which the connection information is saved, based on a result of the analysis, when the connection acceptance response from the partner apparatus to the connection establishment request is detected as the result of the analysis, control transitioning a connection state from the wait state to the connection establishment state, the connection state being contained in the connection information that is searched and obtained.

4. The communication apparatus according to claim 1, wherein the circuitry is configured to:

control transmitting the connection acceptance response to a second partner apparatus, when the connection establishment request is received from the second partner apparatus, the connection acceptance response being a response of acceptance of the connection establishment request, and control transitioning the connection state from a connection request reception state to the connection establishment state, when the acceptance response from the second partner apparatus to the connection acceptance response is detected as the result of the analysis, the connection request reception state being a state in which the connection establishment request has been received.

5. The communication apparatus according to claim 4, wherein the circuitry is configured to:

search connection information corresponding to the acceptance response, from a memory in which the connection information is saved, based on a result of the analysis, when the acceptance response from the second partner apparatus to the connection acceptance response is detected as the result of the analysis, control transitioning a connection state from the connection request reception state to the connection establishment state, the connection state being contained in the connection information that is searched and obtained.

6. The communication apparatus according to according to claim 1, wherein the circuitry is further configured to:

control receiving a request from the external CPU, and transmitting the connection establishment request on the predetermined protocol to the partner apparatus through the network, analyze a first reception frame received after the transmission of the connection establishment request, control transmitting the connection acceptance response to the partner apparatus through the network, when the connection establishment request on the predetermined protocol from the partner apparatus is detected as a result of the analysis of the first reception frame, the connection acceptance response being a response of acceptance of the connection establishment request, analyze a second reception frame received after the transmission of the connection acceptance response, and control transitioning the connection state contained in the connection information, from the wait state to the connection establishment state, when the connection acceptance response from the partner apparatus to the connection establishment request is detected as a result of the analysis of the second reception frame, the wait state being a state of waiting for the response.

7. The communication apparatus according to claim 6, wherein the circuitry is configured to:

search connection information corresponding to the connection acceptance response, from a memory in which the connection information is saved, based on a result of the analysis, when the connection acceptance response from the partner apparatus to the connection establishment request is detected as the result of the analysis of the second reception frame, control transitioning a connection state from the wait state to the connection establishment state, the connection state being contained in the connection information that is searched and obtained.

8. The communication apparatus according to claim 1, wherein the circuitry is configured to sort the reception frame into a control frame and a data frame, and output the control frame to the CPU that performs the process for the predetermined protocol.

9. The communication apparatus according to claim 8, wherein the circuitry is configured to, when a connection break request from the partner apparatus is detected as a result of the analysis, sort the reception frame into the control frame, and output the control frame to the CPU that executes a transition of the connection state based on the control frame.

10. The communication apparatus according to claim 9, wherein the predetermined protocol is TCP, and
the connection break request is a FIN segment in which a bit for a FIN flag in TCP is set to 1, or an RST segment in which a bit for an RST flag in TCP is set to 1.

11. The communication apparatus according to claim 1, wherein the predetermined protocol is TCP, and
the connection acceptance response to the connection establishment request is a SYN/ACK segment in which a SYN flag and an ACK flag in TCP are set to 1.

12. The communication apparatus according to claim 1, wherein the predetermined protocol is TCP, and
the acceptance response is an ACK segment in which an ACK flag in TCP is set to 1 and a SYN flag is set to 0.

13. An information processor comprising:
a CPU that performs a process for a predetermined protocol; and
circuitry configured to:
   control transmitting a connection establishment request on the predetermined protocol or a connection acceptance response, to a partner apparatus through a network, the connection acceptance response being a response of acceptance of the connection establishment request on the predetermined protocol;
   analyze a reception frame received from the network; and
   control transitioning a connection state to a connection establishment state, when, after the transmission of the connection establishment request, a connection acceptance response from the partner apparatus is detected, or when, after the transmission of the connection acceptance response, an acceptance response or the connection acceptance response from the partner apparatus is detected, as a result of the analysis, the connection state being contained in connection information that is shared with the CPU and is used in order to perform a process for the predetermined protocol, the connection establishment state showing that a connection on the predetermined protocol has been established,
wherein the circuitry is configured to determine whether to transition the connection state contained in the connection information based on comparison of an acknowledgement number contained in the reception frame and a sequence number contained in the connection information, and
the sequence number contained in the connection information is at least one of a sequence number that is used at a time of a next transmission and a sequence number for which an acknowledgement is not yet performed.

14. A communication method comprising:
transmitting a connection establishment request on a predetermined protocol or a connection acceptance response, to a partner apparatus through a network, the connection acceptance response being a response of acceptance of the connection establishment request on the predetermined protocol;
analyzing a reception frame received from the network;
transitioning a connection state to a connection establishment state, when, after the transmission of the connection establishment request, a connection acceptance response from the partner apparatus is detected, or when, after the transmission of the connection acceptance response, an acceptance response from the partner apparatus to the connection acceptance response or the connection acceptance response from the partner apparatus is detected, as a result of the analysis, the connection state being contained in connection information that is shared with an external CPU and is used in order to perform a process for the predetermined protocol, the connection establishment state showing that a connection on the predetermined protocol has been established; and
determining whether to transition the connection state contained in the connection information based on comparison of an acknowledgement number contained in the reception frame and a sequence number contained in the connection information, and
wherein the sequence number contained in the connection information is at least one of a sequence number that is used at a time of a next transmission and a sequence number for which an acknowledgement is not yet performed.

15. A computer-readable storage medium having a communication program recorded therein, the communication program, when executed, causing a computer to:
   control transmitting a connection establishment request on a predetermined protocol or a connection acceptance response, to a partner apparatus through a network, the connection acceptance response being a response of acceptance of the connection establishment request on the predetermined protocol;
   analyze a reception frame received from the network;
   control transitioning a connection state to a connection establishment state, when, after the transmission of the connection establishment request, a connection acceptance response from the partner apparatus is detected, or when, after the transmission of the connection acceptance response, an acceptance response from the partner apparatus to the connection acceptance response or the connection acceptance response from the partner apparatus is detected, as a result of the analysis, the connection state being contained in connection information that is shared with an external CPU and is used in order to perform a process for the predetermined protocol, the connection establishment state showing that a connection on the predetermined protocol has been established; and
   determine whether to transition the connection state contained in the connection information based on comparison of an acknowledgement number contained in the reception frame and a sequence number contained in the connection information,
wherein the sequence number contained in the connection information is at least one of a sequence number that is used at a time of a next transmission and a sequence number for which an acknowledgement is not yet performed.

16. The communication apparatus according to claim 1, where the circuitry is configured to determine whether to transition the connection state based on the connection state contained in the connection information and flags contained in the reception frame, and the flags include a SYN flag, an ACK flag, a FIN flag and an RTS flag.

17. The communication apparatus according to claim 1, where the circuitry is configured to update the sequence number for which an acknowledgement is not yet performed, which is contained in the connection information, after the connection state transitions.

18. The communication apparatus according to claim 1, further comprising a memory connected to an internal bus and configured to store the connection information, the connection information being shared with the external CPU, wherein the circuitry is configured to control accessing the memory via the internal bus and transitioning the connection state contained in the connection information in the memory.

* * * * *